(12) United States Patent
Durham et al.

(10) Patent No.: US 9,535,407 B2
(45) Date of Patent: Jan. 3, 2017

(54) INTELLIGENT TOTAL AIR CLIMATE AND CLEANING CONDITIONER

(75) Inventors: Ormonde George Durham, Jordanville, NY (US); Ormonde Ethan Durham, Jordanville, NY (US); Francis C. Fischer, Frankfort, NY (US); Edward E. Lakata, Johnstown, NY (US)

(73) Assignee: OPTO GENERIC DEVICES, INC., Van Hornesville, NY (US)

( * ) Notice: Subject to any disclaimer, the term of this patent is extended or adjusted under 35 U.S.C. 154(b) by 481 days.

(21) Appl. No.: 13/390,456

(22) PCT Filed: Aug. 13, 2010

(86) PCT No.: PCT/US2010/045523
§ 371 (c)(1),
(2), (4) Date: Sep. 11, 2012

(87) PCT Pub. No.: WO2011/020058
PCT Pub. Date: Feb. 17, 2011

(65) Prior Publication Data
US 2012/0324928 A1    Dec. 27, 2012

Related U.S. Application Data

(60) Provisional application No. 61/233,918, filed on Aug. 14, 2009.

(51) Int. Cl.
*F24F 7/007*     (2006.01)
*G05B 13/02*    (2006.01)

(52) U.S. Cl.
CPC ................................. *G05B 13/0205* (2013.01)

(58) Field of Classification Search
CPC .............. G05B 13/0205; F25B 2600/11; F25B 2700/00; F25D 17/045
USPC ............ 62/177–179, 186, 203; 700/276, 278
See application file for complete search history.

(56) References Cited

U.S. PATENT DOCUMENTS

| | | | | |
|---|---|---|---|---|
| 2,162,523 A | * | 6/1939 | Blood et al. | 312/210 |
| 3,102,397 A | * | 9/1963 | Trucchi | 62/240 |
| 4,013,219 A | * | 3/1977 | Jacobson | 236/46 R |
| 4,302,315 A | * | 11/1981 | Stetter et al. | 204/412 |
| 4,369,916 A | * | 1/1983 | Abbey | 236/11 |
| 4,828,132 A | * | 5/1989 | Francis et al. | 220/6 |
| 4,951,737 A | | 8/1990 | Tenhundfeld et al. | |
| 5,012,652 A | * | 5/1991 | Dudley | 62/192 |

(Continued)

FOREIGN PATENT DOCUMENTS

| | | | |
|---|---|---|---|
| JP | 05346257 A | * | 12/1993 |
| JP | 09072572 A | * | 3/1997 |

(Continued)

OTHER PUBLICATIONS

International Search Report and Written Opinion dated Oct. 6, 2010 issued in corresponding international application No. PCT/US2010/045523.

*Primary Examiner* — Len Tran
*Assistant Examiner* — Kun Kai Ma
(74) *Attorney, Agent, or Firm* — Hoffman Warnick LLC

(57) ABSTRACT

An intelligent total air climate conditioner (iTACC) that includes an optically programmed adaptive system controller in electrical communication with at least one sensor and at least one fan motor that is capable adaptive operation of the fan motor based input signals from the at least one sensor.

25 Claims, 34 Drawing Sheets

(56) References Cited

U.S. PATENT DOCUMENTS

| | | | | |
|---|---|---|---|---|
| 5,100,053 | A | * | 3/1992 | Manson et al. ............... 236/47 |
| 5,195,515 | A | * | 3/1993 | Levine ................. 128/203.26 |
| 5,295,531 | A | | 3/1994 | Tsunekawa et al. |
| 5,399,121 | A | * | 3/1995 | Gray et al. ................ 454/137 |
| 5,507,847 | A | * | 4/1996 | George et al. ............... 55/486 |
| 5,665,965 | A | * | 9/1997 | Durham, III ......... G01D 5/3473 250/214 PR |
| 5,697,223 | A | * | 12/1997 | Ishii ................ B60H 1/00785 165/231 |
| 5,762,265 | A | * | 6/1998 | Kitamura ............. F24F 11/006 165/205 |
| 5,850,304 | A | * | 12/1998 | Elmers .............. H04B 10/114 340/12.54 |
| 5,857,906 | A | | 1/1999 | Cho |
| 6,067,812 | A | | 5/2000 | Bushnell et al. |
| 6,087,654 | A | * | 7/2000 | Durham, III ......... G01D 5/3473 250/231.13 |
| 6,772,714 | B2 | | 8/2004 | Laird et al. |
| 7,163,156 | B2 | | 1/2007 | Kates |
| 7,204,429 | B2 | | 4/2007 | Olney |
| 7,264,046 | B1 | | 9/2007 | Futernik et al. |
| 7,350,371 | B2 | | 4/2008 | Lee et al. |
| 2005/0031503 | A1 | * | 2/2005 | Fox et al. ............... 422/186.04 |
| 2005/0056481 | A1 | * | 3/2005 | Mafi et al. .................... 181/202 |
| 2005/0278071 | A1 | * | 12/2005 | Durham, III ................ 700/276 |
| 2005/0282487 | A1 | | 12/2005 | Hecht et al. |
| 2006/0024217 | A1 | * | 2/2006 | Law ...................... A61L 9/015 422/186.04 |
| 2006/0185931 | A1 | * | 8/2006 | Kawar ........................ 181/202 |
| 2007/0011930 | A1 | * | 1/2007 | Yarmosh ....................... 40/725 |
| 2007/0263338 | A1 | * | 11/2007 | Nakashima ............. H01T 23/00 361/220 |
| 2008/0074824 | A1 | * | 3/2008 | Furuhashi ................ A61L 9/22 361/231 |
| 2008/0083233 | A1 | * | 4/2008 | Song ............................. 62/127 |
| 2008/0156887 | A1 | * | 7/2008 | Stanimirovic ............... 236/12.1 |
| 2008/0182506 | A1 | | 7/2008 | Jackson et al. |
| 2008/0281472 | A1 | | 11/2008 | Podgorny et al. |
| 2009/0157529 | A1 | * | 6/2009 | Ehlers et al. ................... 705/26 |

FOREIGN PATENT DOCUMENTS

| | | | |
|---|---|---|---|
| JP | 2000334331 | A * | 12/2000 |
| JP | 2007101174 | A * | 4/2007 |

* cited by examiner

FIG. 5

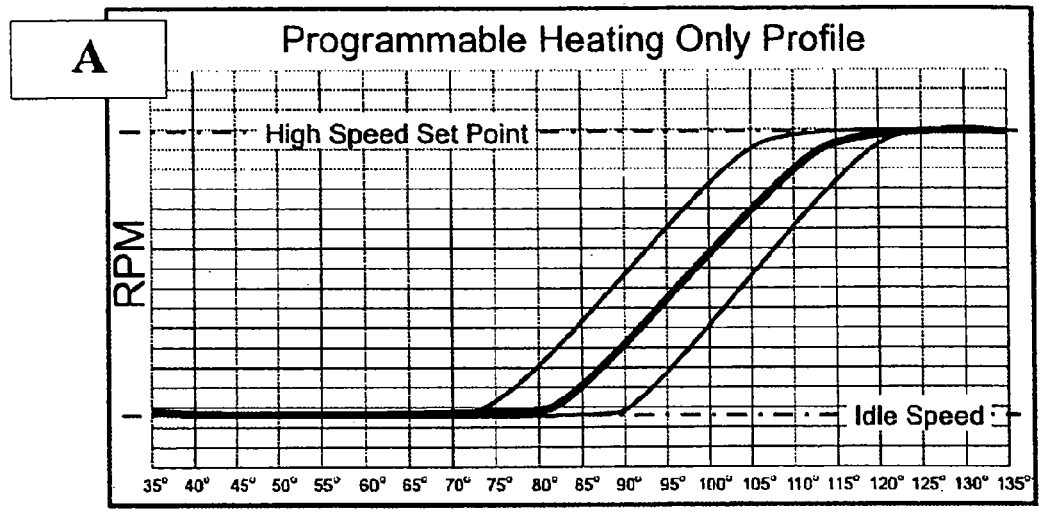

Fig 1 Shows simple "Heating Only temperature response profile". As the temperature increases, the fan speed changes according to the illustrated pre programmed graph. The multiple lines indicate a wide range of programmability. Furthermore, the slope of these curves are also fully programmable.

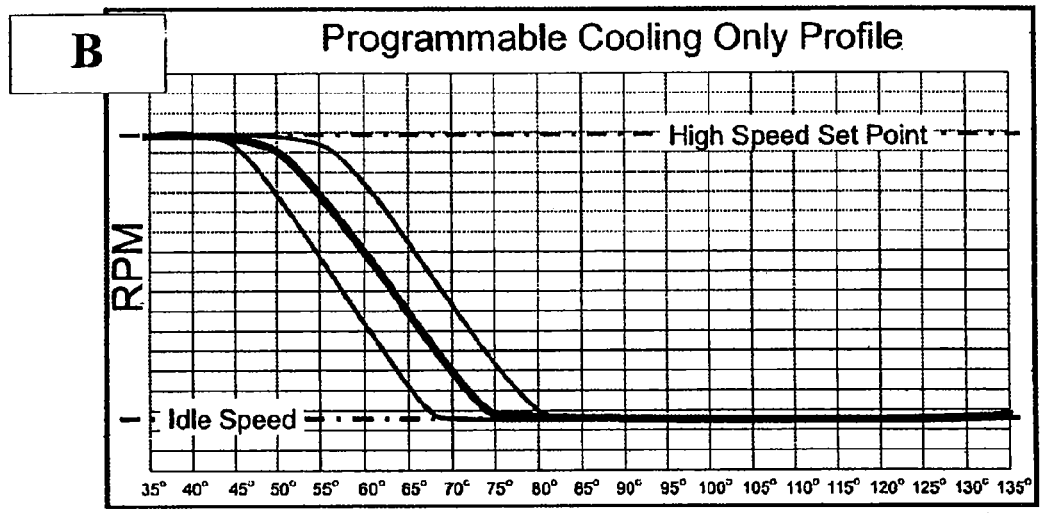

Fig 2 Shows simple "Cooling Only temperature response profile". As the temperature increases, the fan speed decreases and changes according to the illustrated pre programmed graph. The multiple lines indicate a wide range of programmability. Furthermore, the slope of these curves are programmable.

FIG. 5 (continued)

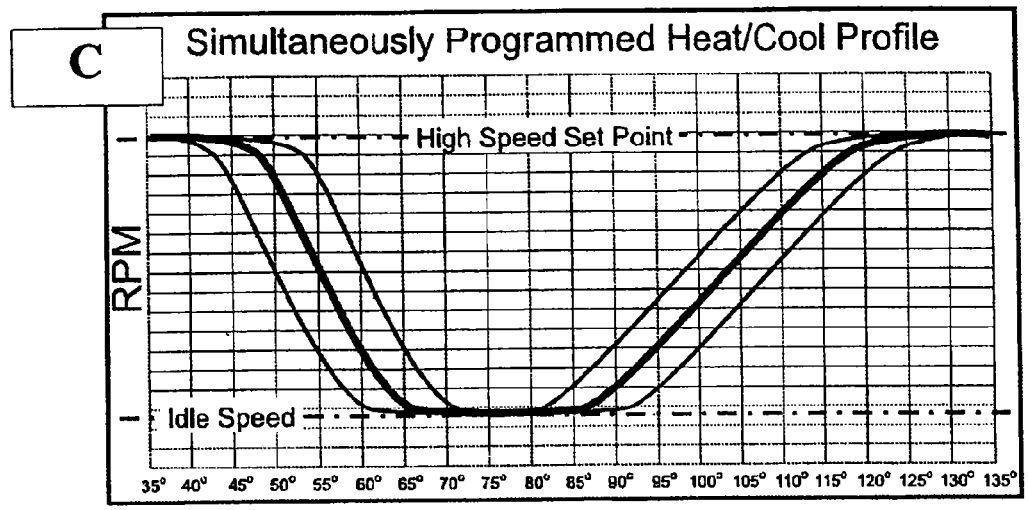

Fig 3 Shows a preprogrammed superposition of the "Heating and Cooling profiles" from Fig's 1 & 2. This is the current type of profile implemented in a standard A1Unit-CU. This profile serves to accommodate most typical HVAC heating and cooling systems. Slopes and ranges of these curves are fully programmable.

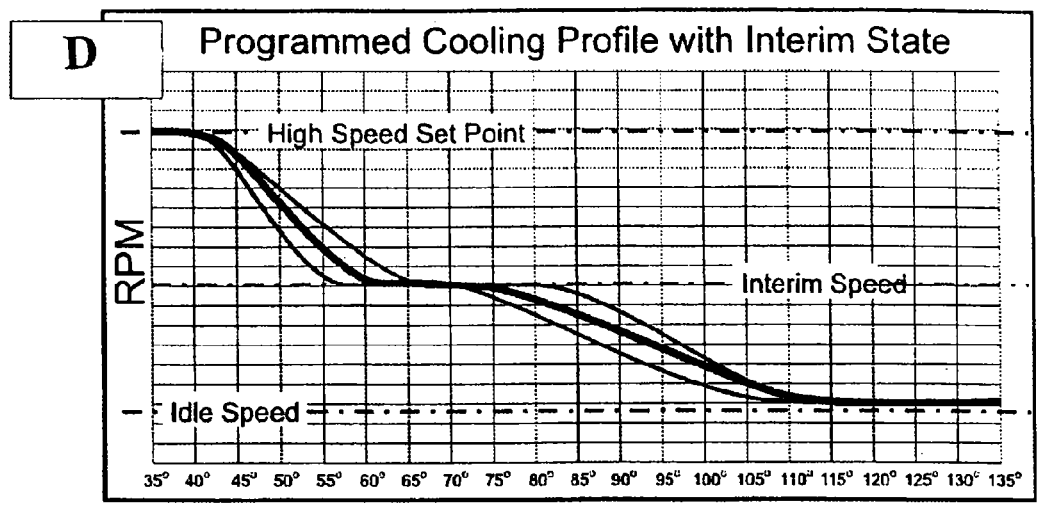

Fig 4 Shows complex "Cooling temperature response profile". As a core temperature increases, the fan speed changes according to the illustrated pre programmed graph. This configuration supports an interim speed and can be u and set to maintain filtration air flows, etc...

FIG. 5 (continued)

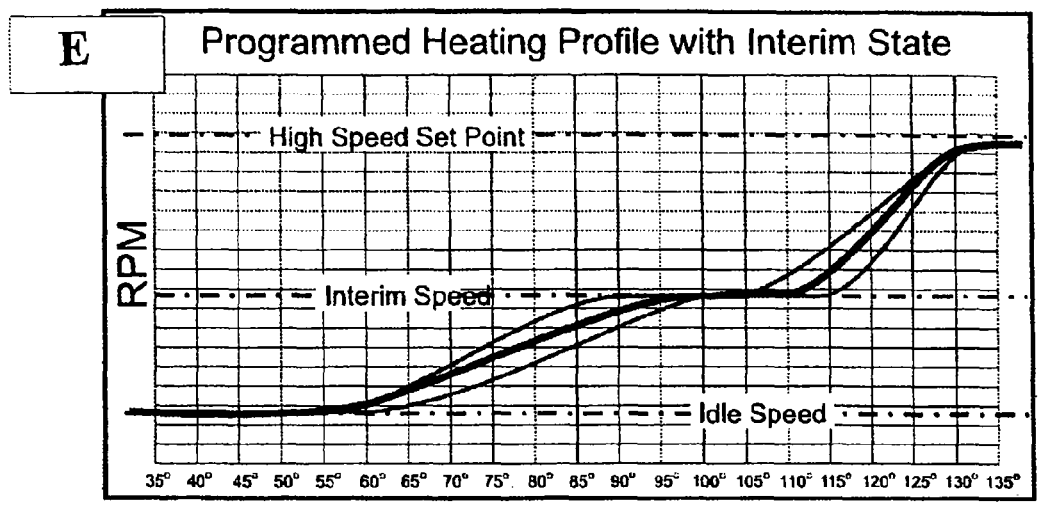

Fig 5 Shows complex "Heating temperature response profile". As the core temperature increases, the fan speed changes according to the illustrated pre programmed graph. This configuration supports an interim speed and can be used and set to maintain filtration air flows, etc...

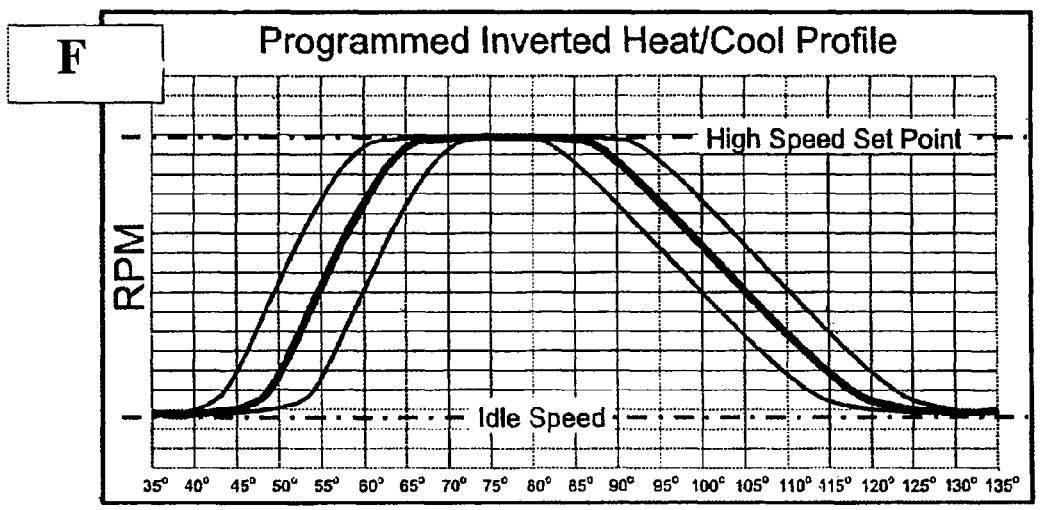

Fig 6 Shows an inverted of the Heat / Cool profile. It may have some applications but is shown here to illustrate the flexibility and advantage and of OGD's proprietary Optic programming.

FIG. 6

Wave Mixing 2D and 3D
Sine / Cosine Combo & 2d two plane Plot

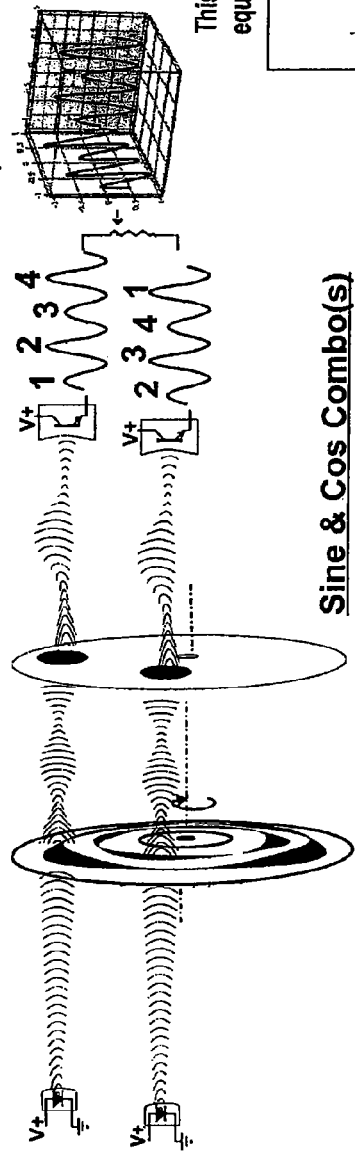

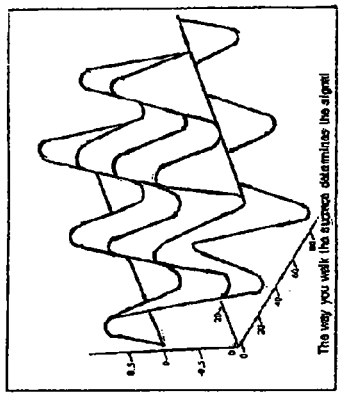

This "maps" 2d vectors / tracks into equivalent 3d space // functions

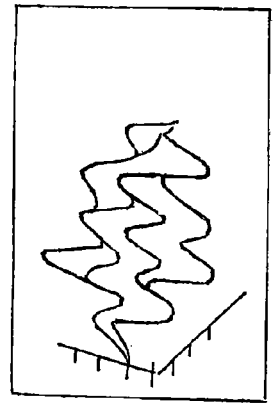

N' Result Options for 1a & 2a

N' Result Options for 1a & 2b

Sine & Cos Combo(s)

Gives multi path, vector options from just two tracks / vectors; tracks are synced / timed so that can yield differential analysis; provides huge memory equivalent as all this data is stored / available;

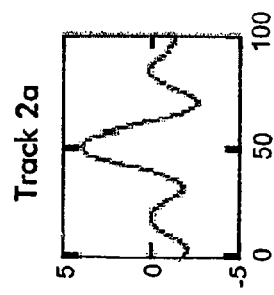

Track 2a

Track 2b

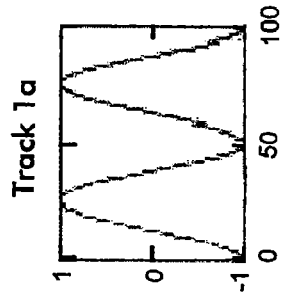

Track 1a

Track 1a fig. 2C Basic OP side disc & mask view : 2Tracks + 2 Channels & N-Combos; mixed passive

FIG. 7 (continued)
Creating multiple opto paths creates parallel programs that co-execute different vectors, equations and integration results from a single disk equation, but time displaced yet time linked.
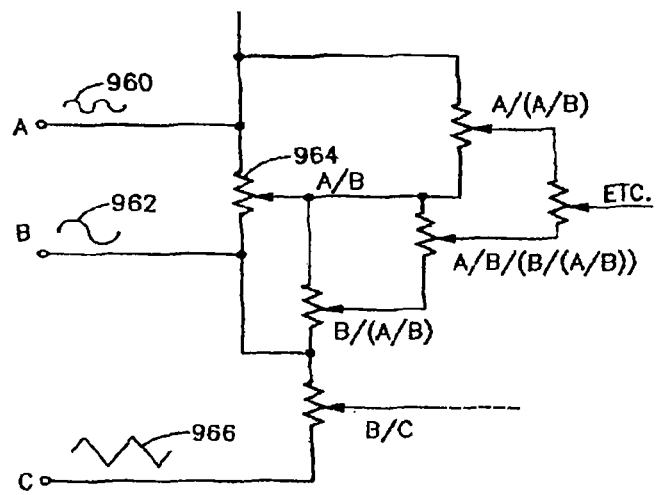
FIG.27A
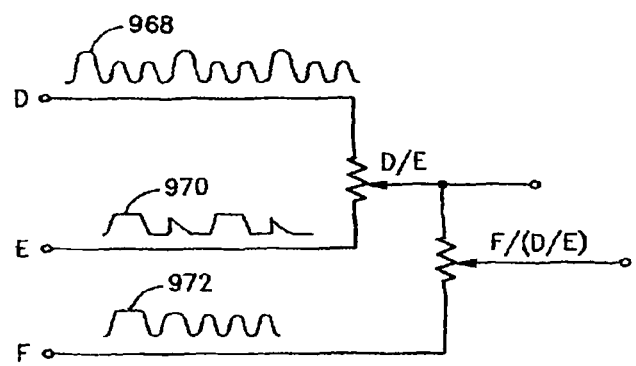
FIG.27B
The disk in turn can have multi tracks with the same but phased programs, new vectors / programs and outhe concurrent data and ifo to be co-processed

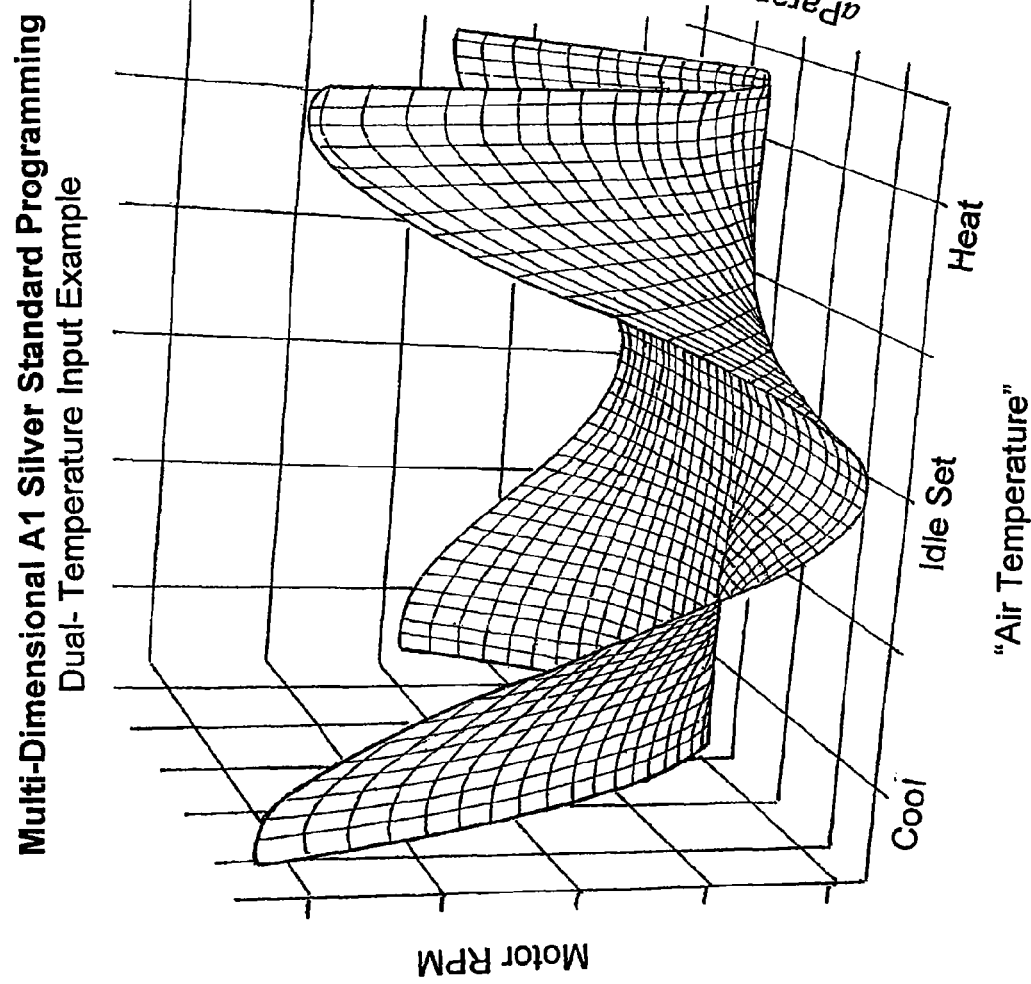

FIG. 11B
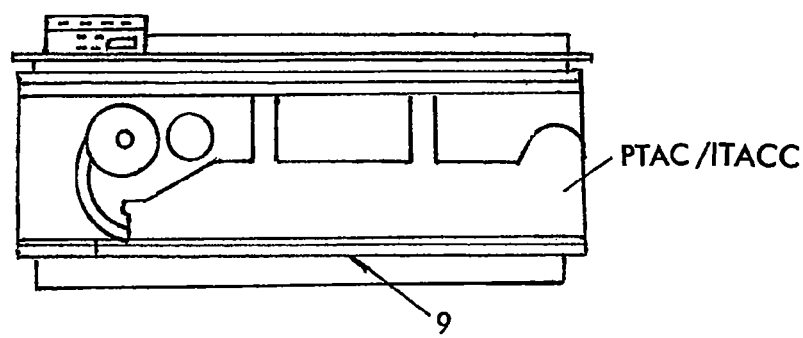
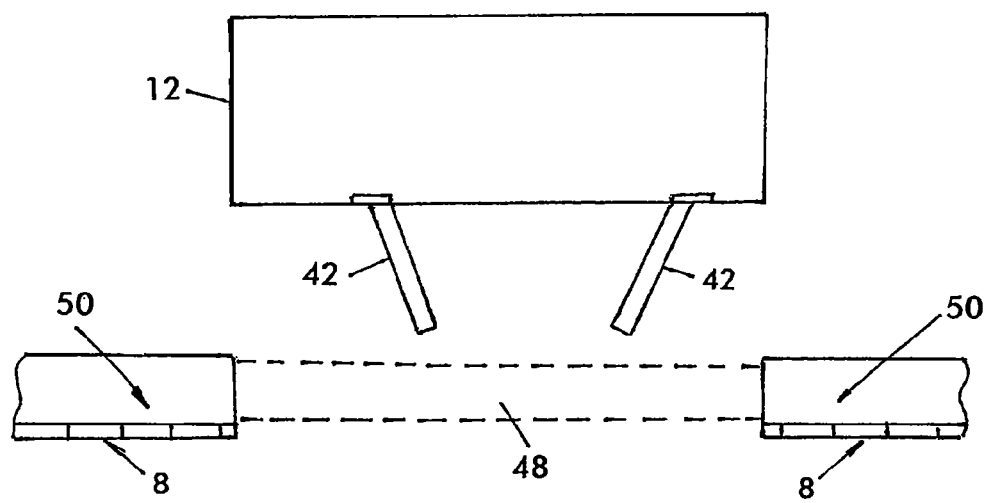
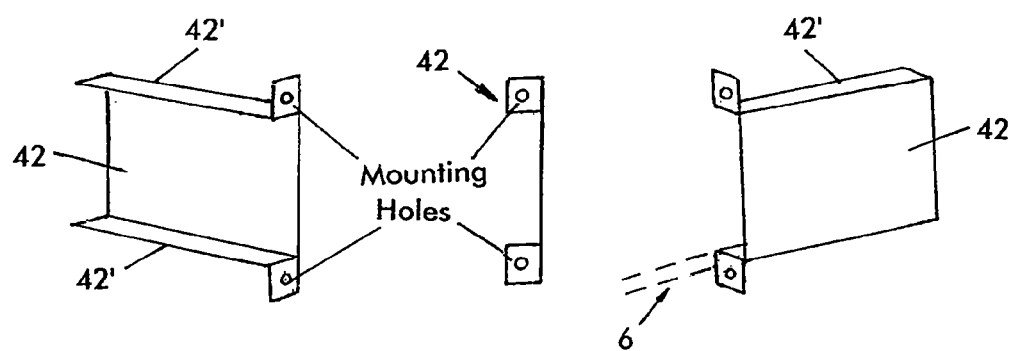

INTELLIGENT TOTAL AIR CLIMATE AND CLEANING CONDITIONER

CROSS-REFERENCE TO RELATED APPLICATIONS

The present application is a 35 U.S.C. §371 National Phase conversion of PCT/US2010/045523, filed Aug. 13, 2010, which claims benefit of U.S. Provisional Application No. 61/233,918, filed Aug. 14, 2009, the disclosure of which is incorporated herein by reference. The PCT International Application was published in the English language.

FIELD OF THE INVENTION

The disclosure relates to air conditioners.

ABBREVIATIONS

OP refers to Optical, Radiant, Wave, Electromagnetic Energy Programming & Processing which is disclosed in the references cited below.

GP refers to Graphical, Vector, Integration, Algorithmic—Math; Programming & Processing which is disclosed in the references cited below.

Opto or Optical refers to the combination of OP (the type of energy) and GP (the type of math) as disclosed in the references cited below.

OPP refers to an Opto Programmed Processor.

PTAC refers to a Packaged Terminal Air Conditioner.

ITACC refers to Intelligent Total Air Climate & Cleaning Conditioner.

ACC refers to Adaptive Climate Controller.

BACKGROUND AND SUMMARY OF DISCLOSURE

The present disclosure generally relates to the application of optical and graphical programming (sometimes referred to as OP/GP) to the control of the operation of electrical devices such as electromechanical devices integrated with an HVAC system. U.S. Pat. No. 5,665,965 (incorporated by reference) and U.S. Pat. No. 6,087,654 (incorporated by reference) disclose the concepts of optical and graphical programming. U.S. Pat. No. 7,204,429 (incorporated by reference) and U.S. Pat. Publication No. 2005/0278071 (incorporated by reference), disclose applications of optical and graphical programming to HVAC systems. It has been found that the addition of an Adaptive Climate Controller (ACC) that is based on optical and graphical programming to a standard PTAC (Packaged Terminal Air Conditioner) results in many beneficial features.

U.S. Pat. No. 5,665,965 discloses converting an electronic signal using electromagnetic wave emitters (e.g. Light Emitting Diodes—LEDs, Infrared Emitting Diodes—IREDs, Photodiodes, Hall effect devices, emitting transducers, etc) to a free space transmissible electromagnetic wave (e.g. an optical or electromagnetic wave or "opto wave" as opto shows this technique includes much more than what is normally considered optical or light based only) and manipulating the electromagnetic or opto wave to change the content thereof in the electromagnetic domain (e.g. optical domain/opto domain). As a result, programming could be accomplished in the electromagnetic/opto domain, rather than in the electronic domain.

U.S. Pat. No. 5,665,965 disclosed a method for programming in the electromagnetic domain (e.g. optical domain) which used graphical wave shaping windows and other co-processing optical path elements to accomplish optical programming. These other optical path elements included one or more graphical shapes that altered and reshaped the optical wave, whereby the content thereof, which originated from an electronic signal, was changed thus accomplishing optical programming. The altered electromagnetic wave was then received by at least one compatible detector (e.g. Photo Txs, Photo Diodes, CdS Cells, sensing transducers, etc) and converted to a proportional electronic output signal. That proportional electronic output signal, therefore, could be changed or re-programmed by changing or reprogramming the input electromagnetic wave. Thus, the prior art teaches the conversion of electronic signals into a free space transmissible electromagnetic wave (e.g. optical wave), alteration of the electromagnetic wave by passing the same through a graphical shape to obtain an altered electromagnetic wave (the programming step), and conversion of the altered electromagnetic wave into an electronic signal, thereby allowing for the generation of a new electronic signal by altering the content of the original signal graphically in the electromagnetic (e.g. optical) domain as opposed to manipulating the content of the signal electronically. The combination of emitters, graphical shapes, and detectors, therefore, served as a basis for a processor or opto/optically programmed processor (OPP) capable of altering the information (content) contained in any electronic signal in the electromagnetic (e.g. optical) domain, for example, by changing the shape of the optical signal. This process has been referred to as optical programming in prior patents.

U.S. Pat. No. 5,665,965 discloses an implementation of OP/GP using an encoder. The encoder used shaft motion to create the "clocking" function for most of the processing. This arrangement used simpler vectors or mostly integer type graphical functions to generate programs based on OP.

U.S. Pat. No. 6,087,654, which was based on the original concept of electromagnetic wave shaping, taught more sophisticated techniques to obtain more complex vectors and non-integer shapes for the mapping, the programming and the execution of virtually any 2d or 3d function in the electromagnetic domain (e.g. optical domain). The new methodology disclosed and performed another "clocking" method by driving the emitters and detectors with active electrical vectors or signals to cause the "motion" of the electromagnetic wave (e.g. by the selective operation of an optical emitter) without the need for the motion of the shaft of an encoder. The generated "clocked" electromagnetic wave could still be shaped using the appropriate graphical shaping windows thereby allowing for optical programming.

U.S. Pat. Nos. 5,665,965 and 6,087,654 disclosed OP control methods/techniques, and an apparatus for implementing the techniques, embodied in a single small package that could be used with a user's power devices or power amplifiers. This package had the controls, intelligence and OP "software" embedded and generally separate from the power electronics and could be packaged inside an encoder or some other small control package. The encoder was a controller very much like a microchip, except the encoder also included the memory, clocks, I/Os, buffers, software, etc. These earlier patents did not disclose a specific type of power driver method or apparatus. Rather, these patents disclosed a package that would only provide an input signal to a "dumb power device" so that it could be used with any off-the-shelf "generic power amplifier or driver".

U.S. Patent Publication No. 2005/0278071 discloses applications of OP. For example, it shows an opto-programmed controller that can be programmed with a number of climate profiles that operates a fan motor of an HVAC system according to a non-linear climate profile, which includes target speed values for the fan motor based on a climate condition (for example, thermal capacity of air). Furthermore, it discloses using OP to program math functions and signals at low power levels while concurrently, and directly controlling, programming and managing high power signals, circuits and power devices, thereby achieving multitasking, concurrent parallel processing. In addition, it discloses using additional expanded sensor vector clocking techniques and combining the control intelligence with the power devices, circuits and drivers all in a single, simple, complete package. There is, therefore, no need for the use of any outside shaft type encoder or a separate small controller package; nor is there a need for a separate or generic power amplifier.

The present disclosure teaches a new application for the controller disclosed in U.S. Patent Publication 2005/0278071. The controller is called an A1 Adaptive Climate Controller (A1 ASC or A1ASC) in this application. The A1 ASC is an OP (optically/Opto Programmed) system controller. It is not a 2-state, but rather continuously dynamic, adaptive intelligent controller. In one preferred embodiment, an A1 ASC unit (disclosed in U.S. Patent Publication No. 2005/0278071) is conveniently placed inside a Packaged Terminal Air Conditioner (PTAC) and interfaces with its existing controls. The A1 ASC has multiple parallel Opto Processors for the performance of multiple concurrent control functions giving powerful new features to a PTAC in a simple and reliable way. For example, the improved operation of both indoor and outdoor fan motors is done with the A1ASC unit along with the improved operation of the compressor and the heating element.

A typical conventional PTAC utilizes 3 primary motors:
  a. Indoor air fan motor;
  b. Outdoor air fan motor;
  c. Compressor motor.

A conventional PTAC includes a simple controller board to control these motors. The controller utilizes simple logic and simple relays. These relays are typically 2 state devices: ON/OFF.

Integrating the A1 ASC into a PTAC brings "Adaptive Control" to the controlled motors. Thus, the motors are no longer 2-state devices, but are fully programmable, adaptive and are ultimately controlled by the A1 ASC's application specific, dynamic, optically programmed profiles. The OP controller can either directly control the motors, or can piggy-back (series or parallel) on the already-existing controller circuitry.

Adaptive speed control of the indoor fan, adaptive speed and idle speed in particular, facilitate new functions that were in the past, unrealizable.

To Summarize, a system according to a preferred embodiment of the present invention may include at least one central feature and one or more of the novel features listed below. The features marked novel are considered new features (i.e. new in combination with a conventional PTAC). Those marked known are considered related to or disclosed in the references cited above.
  1. Adaptive Speed Indoor fan (Novel)
    a. With Two Multi selectable top speed levels
    b. And a continuous low "idle speed" operation
  2. Adaptive Output Power OP Electronic Air Purifier (Novel)
  3. Application Specific "Adaptive" Air Filters (Novel)
  4. Discharge Air Flow Temperature Sensor (Novel)
  5. A1 ASC unit (known)
  6. Full variable Manual Speed Indoor Fan Control (Novel)
  7. New Moisture Removal Techniques (Novel)
    a special moisture absorbing Compressor Sleeve Cover (Novel)
  8. Compressor Noise Reduction Sleeve (Novel)
  9. Adaptive Speed Outdoor Fan (Novel)
  10. Special Outside Equipment Filters (Novel)
  11. Custom and Designer Colors and Designer Artwork (Novel)
  12. Adaptive Heating/Adaptive BTU Capacity (Novel)
  13. Adaptive Outdoor Air Louver (Novel)
  14. Remote Adaptive Controlled Room Management System—RMS (Conventional 1).

It has been found that when an A1 ASC is used as a controller in a conventional PTAC, the way the actual PTAC operates is dramatically altered and improved. Specifically, in the simplest application, the A1 ACC runs the PTAC's internal fan in continuous but variable speed mode that intelligently adapts the air flow to match discharge air temperature output, which helps to maintain tighter temperature control to set point within the climate controlled space room. Since the total room temperature is maintained and stratification effects are reduced, compressor and heating element demand of the PTAC are significantly reduced (up to over 40%). As a result:
  1. tighter system and room temperature control is maintained to set point;
  2. less cycling of the compressor is achieved while maintaining the same set point temperature saving energy and reducing compressor wear;
  3. less cycling of the heating elements is achieved while maintaining the same set point temperature saving energy and reducing heating element wear;
  4. humidity is better controlled and reduced;
  5. noise reduction benefits are obtained;
  6. the indoor fan runs at much reduced speed during the compressor off cycles using less energy;
  7. the outdoor fan speed gently ramps up to high speed as the condenser increases Btu output saving fan and condenser energy and lowering fan noise.

Moreover, new additional features can be added that without the adaptive speed fan motor would not be of equal functional benefit. Specifically, the following features can be added to enhance airflow and thermal discharge without system degradation:
  1. indoor air intake air filters with much higher (7-15) MERVs (minimum Efficiency Reporting Values) ASHRAE Standard 52.2 that better filter room air for both equipment and occupants;
  2. discharge air exhaust filter and ion reduction filter; a secondary filter that helps charge and enlarge air particles and contaminants for better subsequent capture and removal (including variable level and softer ionization);
  3. variable level charge air purification;
  4. adaptive speed indoor fan;
  5. adaptive speed outdoor fan;
  6. outdoor air vent louver control;
  7. drawing air through the outside coil vs. pushing air through the outside coil;
  8. variable and adaptive heating element control; and
  9. compressor demand reduction and soft ramping functions.

A system according to the present invention can further include the following features:
  1. compressor noise reduction sleeve;
  2. compressor moisture removal reduction sleeve;

3. custom colors, images, graphics, logos;
4. outside grilles that can be customized for decoration and advertisement.
5. ITACC indoor custom built quality enclosure to make the unit a rich piece of furniture instead of a piece of commodity equipment.

DESCRIPTION OF THE FIGURES

FIG. 5 illustrates other examples of optically programmed 2D profiles.

FIG. 6 illustrates the mixing of waves in the optical domain to obtain 2D and/or 3D plots.

FIG. 8 illustrates a 3D profile which can be very simply created and used by an OPP to drive a motor, machine or device.

FIG. 11B illustrates the installation of the above wall sleeve in a wall opening.

DETAILED DESCRIPTION

Disclosed herein are arrangements and methods to upgrade and improve a conventional heating, ventilating and air conditioning (HVAC) system. An apparatus according to the present invention is an iTACC, which has been realized by modifying a conventional PTAC to include optical and graphical programming in order to attain enhanced functionality, improved efficiency, and lower noise compared to an ordinary PTAC. Thus, disclosed below and in the Figures are newly added features to a PTAC or novel features, arrangements and functions which are based on the optical and graphical programming concepts disclosed in U.S. Pat. Nos. 5,665,965, 6,087,654, 7,204,429 and U.S. Patent Publication No. 2005/0278071.

The list below includes reference numbers, names, and abbreviations for the features of an iTACC according to the present invention, which are used throughout to refer to the same features in each figure.

1—Adaptive Power Output-Fan Indoor=AO-FI
2—Adaptive Power Output-Electronic Air Ionizer=AO-EAI
3—Air Filters Special Purpose Activated=AFA
  a. Room Air, Occupied Space=RA
  b. iTACC Room Discharge Air=DA
  c. Outdoor Air=OA
4—Electrical Transducer Sensor; Low Power Inputs/signals=ETS—
  a. Environmental; Temperature, Humidity, Pressure, etc=Env
  b. Air and Gases; CO, CO2, O2, O3, NO, HS, Radon, etc=Air
  c. Occupancy, Speed, Air Flow, Proximity, Pressure, Noise, etc=Oth
5—A1 Adaptive System Controller=A1 ASC
6—Manual Override Control=MOC
7—Dual Purpose Compressor Sleeve=CS—
  a. Noise Reducing Sleeve=NRS
  b. Condensate Evaporator Sleeve=CES
8—Acoustic Noise Barrier=ANB
9—Adaptive Power Output-Fan Outdoor=AO-FO
10—Remote Controlled Room Management System=RMS
11—PTAC/iTACC Cover & Grill Options=PCG—
  a. Designer Colors, Images, Photos=DC
  b. Logos, Advertisements, Signs, Etc=LA
12—PTAC/iTACC Wall Sleeves=PWS—
  a. Collapsible Rigid=CR
  b. Standard Size Converter=SSC
13—Adaptive Power Output—Electric Heating Element=AO-EHE
14—Adaptive Power Output-Compressor=AO-Comp
15—Adaptive Power Output-Air Louvers=AO-AL
16—Heat/Cool Exchanger=HCE—
  a. Indoor=I
  b. Outdoor=O
17—Indoor Section
18—Outdoor Section
21—Adaptive Air Flow Rates (soft start, ramp up, ramp down and idle)=AAF A1 ASC refers to an A1 Adaptive Climate Controller disclosed in U.S. Patent Publication No. 2005/0278071, which includes a plurality of OPPs.

Figure 1:
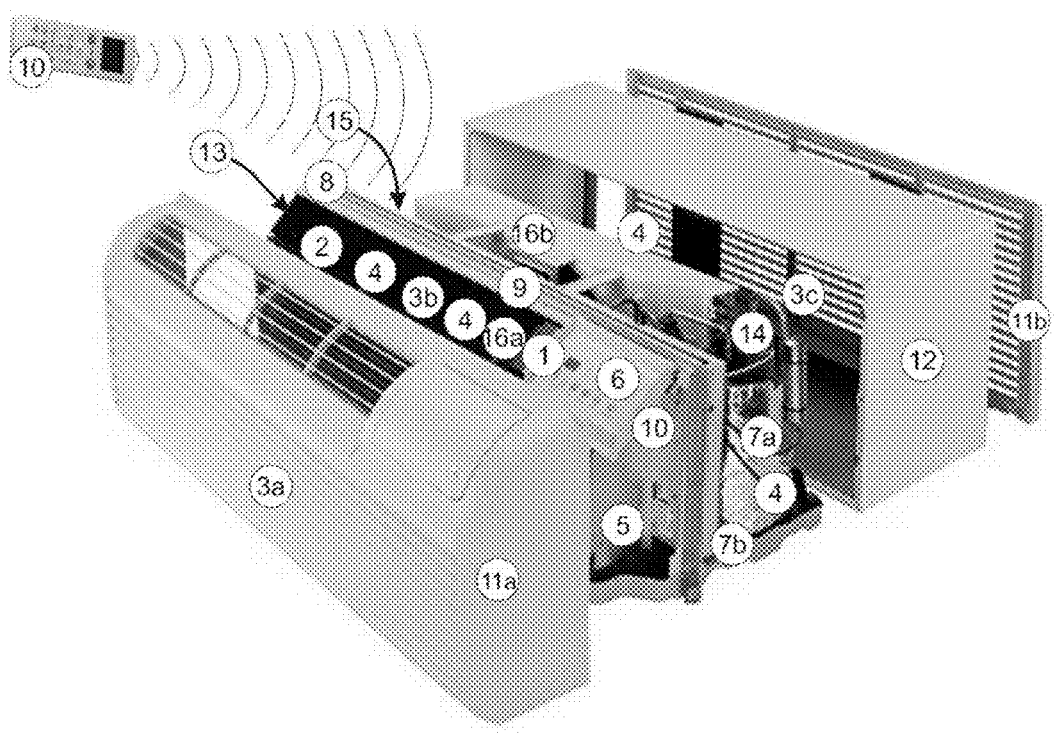
FIG. 1 illustrates an exploded view of a disassembled iTACC according to the present invention.

FIG. 1 illustrates a perspective exploded view of the various components of an iTACC according to the present invention.

Figure 2A:
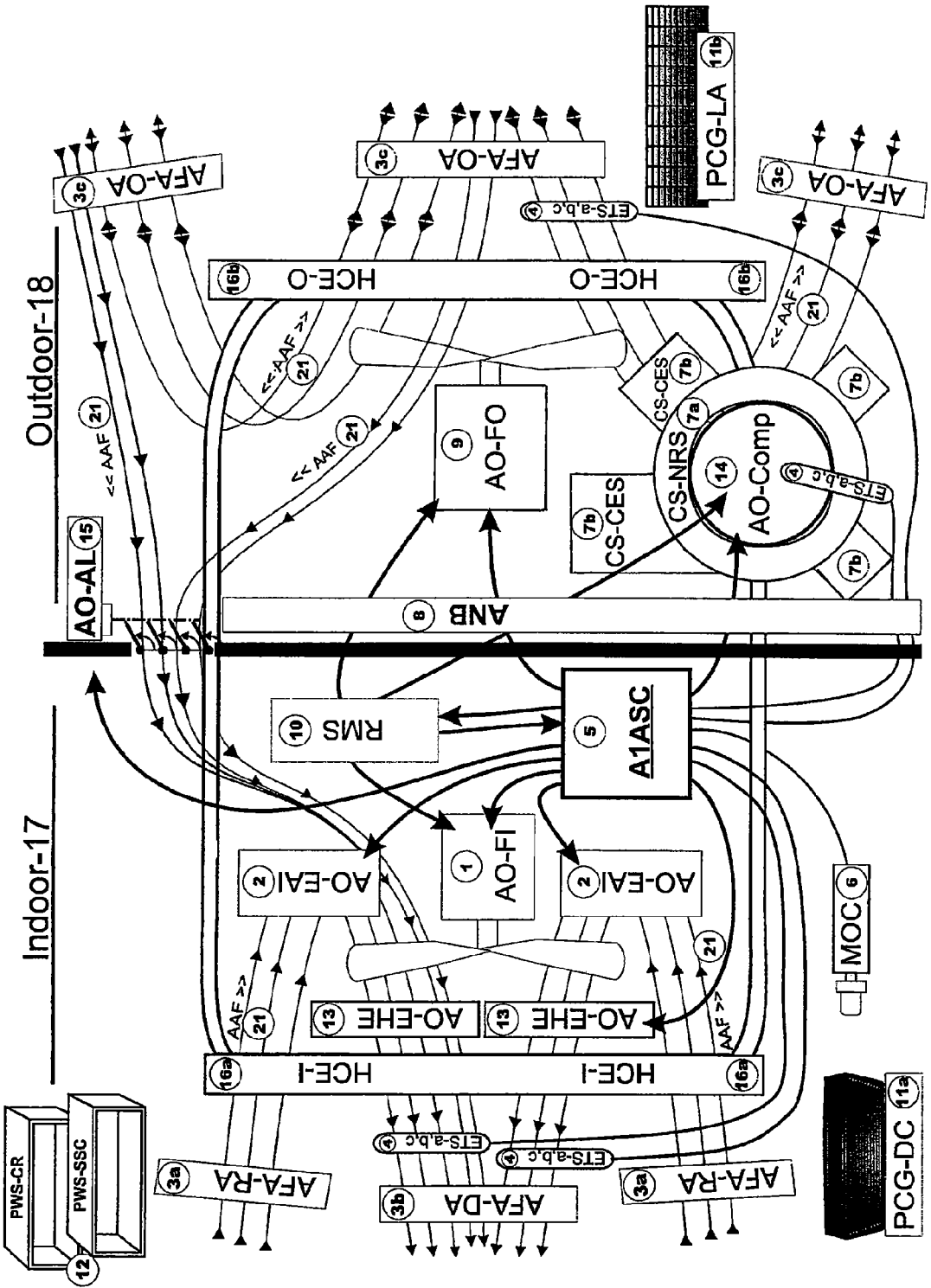
FIGS. 2A-2J' schematically illustrate the features of a system according to the present invention.

FIG. 2A schematically illustrates the relationship of the various components of an iTACC according to the present invention. Note that thin arrows & lines identify the movement of air, while the thick arrows and heavy lines are intended to identify electrical communication among the components.

Referring to FIG. 2A, an iTACC according to the present invention includes an AO-FI 1, at least one (preferably two) AO-EAI 2, an AO-FO 9, an AO-Comp 14, at least one AO-EHE 13, a plurality of ESTs 4, an RMS 10, and an AO-AL 15 all in operative communication with an A1ASC 5. A1ASC 5 is an optically programmed controller that includes a plurality of OPPs, a description of which appears in U.S. Patent Publication No. 2005/027807. A1ASC 5 can be provided with operating OP profiles. The operating OP profiles are used by A1ASC 5 to operate AO-FI 1, AO-FO 9, AO-Comp 14, AO-EHE 13, AO-EAI 2, and AO-AL 15 in order to regulate the speed of the air flow and the condition of the air flowing through the iTACC and into the space serviced by the iTACC. Active air flow elements AO-FI 1, AO-FO 9, and AO-AL 15 regulate air flow (in conjunction with AFA-RA 3a, AFA-DA 3b, and AFA-OA 3c), active heating/cooling elements AO-Comp 14 (in conjunction with HCE-I 16a and HCE-O 16b) and AO-EHE 13 regulate air temperature, and active air purification elements AO-EAI 2 regulate air ionization level. ESTs 4 provide signals related to the environmental conditions (e.g. temperature, humidity, presence or lack of specific gases such as O2, CO2 etc.) to A1ASC 5. A1 ASC 5 then operates AO-FI 1, AO-EA 12, AO-FO 9, AO-Comp 14, AO-AL 15 and AO-EHE 13 concurrently and adaptively according to an OP profile. A1ASC 5 may also be operated manually by MOC 6 or it may be operated by RMS 10.

Manual, continuously adaptive, speed control is not a feature that has been available in PTACs. Introducing a manual speed control for the fan is not something PTAC designers would consider given the costs and complexities associated for implementing the same with conventional digital techniques. The benefits of a continuously operating fan have been demonstrated, however. MOC 6 is one of the A1 ASC's control inputs. A1 ASC 5 is configured to accept multiple inputs as disclosed earlier. Internal OP within A1 ASC 5 optically computes all sensor inputs simultaneously and produces a composite programmed system response. The system makes decisions based on the manual setting alone or in combination with all other parameters.

A1 ASC 5 can be controlled by a 2 state global controller and room management systems, RMS 10. In conventional systems, these systems have limited features and functionality as far as controlling an adaptive speed drive. RMS 10 can be configured to monitor the room temperature and interface with the iTACC based on that and can have an auto set back feature for energy conservation and room environment.

Figure 3:
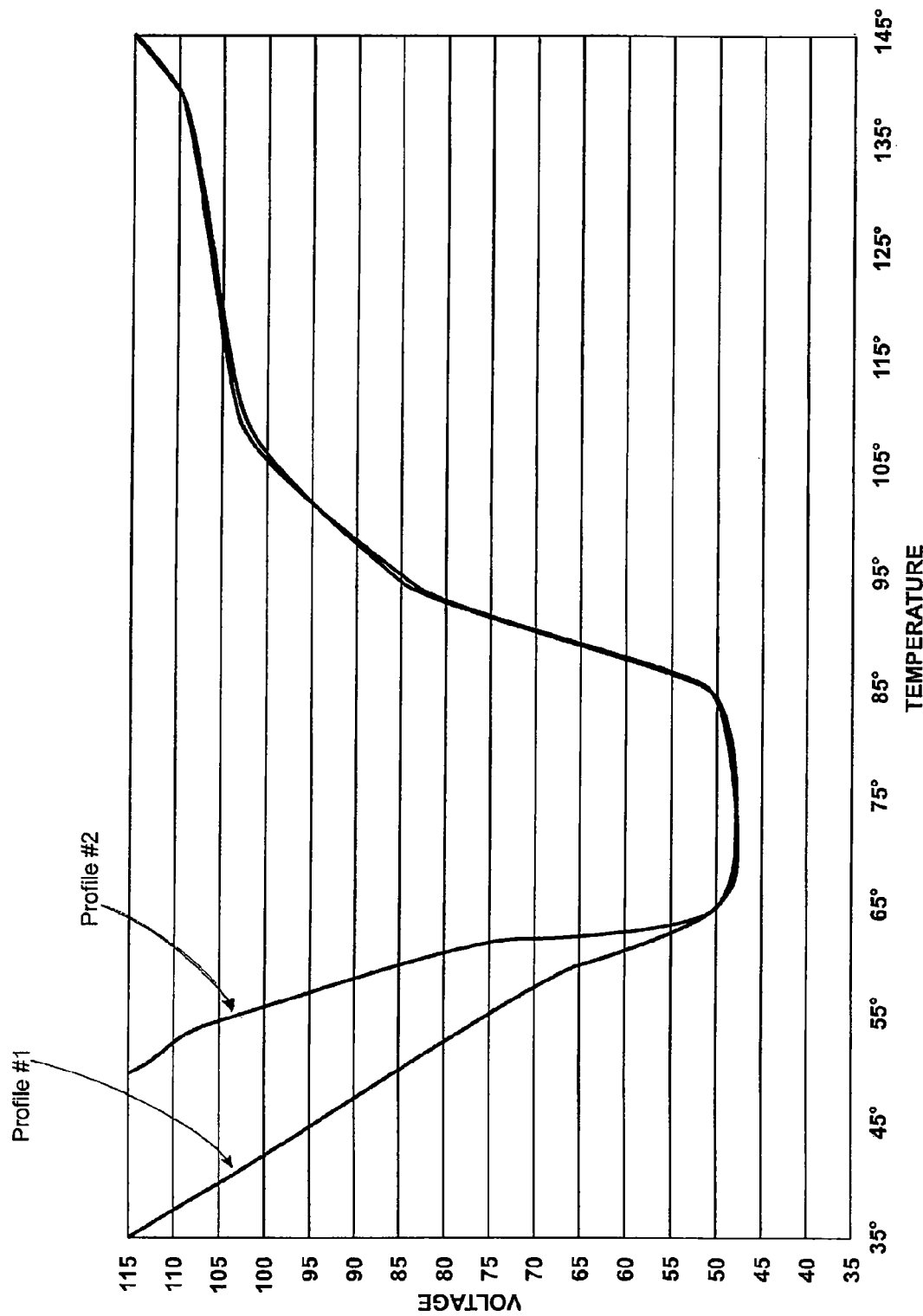
FIG. 3 shows an example of an optically programmed climate profile.

As indicated above, A1 ASC 5 uses an OP profile to generate output signals based on input signals from ETS(s) 4. An OP profile can be a two dimensional (2D) plot representing a relationship between an input value (e.g. temperature or humidity from an ETS 4) and a desired output value (e.g. speed of a fan). An OP profile can be a three-dimensional plot representing the relationship between two input values (e.g. temperature and humidity) and a desired output value (e.g. speed of a fan). Furthermore, an OP profile can be an n-dimensional plot representing the relationship between several input values (e.g. temperature and humidity) and several output values (e.g. the speed of an indoor fan and the speed of the outdoor fan). The prior art cited above discloses the concept of OP profiles. For example, FIG. 3 shows a typical 2D plot of temperature versus output power OP profile. A plot similar to the one shown by FIG. 3 is disclosed in U.S. Pat. No. 7,204,429, and U.S. Pat. Pub No. 2005/0278071 A1. FIG. 3 shows that the relationship of temperature (BTU) input and power output is not a straight, linear or single function relationship, rather the relationship is non-linear. FIG. 3 is the plot of a combined heat and cool profile (program) with a low "idle speed" (or minimum output power) at room temperature (72° degrees) and maximum power out for heating at 145° degrees and two profiles for cool maximum power outputs at 35° and 55°. As an example, FIG. 3 illustrates the tracking of a temperature value from a temperature sensor in the discharge room air (DA). An OP (Opto Program) residing in A1 ASC 5 converts this incoming temperature signal into an output to a power device. This output power device in turn would vary the power to one or more iTACC power devices like the fan (AO-FI, AO-FO), the compressor (AO-Comp), the heating element (AO-EHE) or other electrically powered devices whereby the devices are operated in response directly to the sensor activity.

FIG. 5 shows multiple 2D OP profiles of the kinds of OP/GP Opto programs that can be employed to optimize and vary fan speed to temperature any number of ways. The plots in FIG. 5 represent the relationship between temperature and output power which can be employed by A1ASC 5 to provide an appropriate output signal to a device such as AO-FI 1. As is apparent the profiles used by A1ASC 5 are not straight, linear or single function but can be complex functions with discontinuities, inversions, overlaps and much more. Multiple concurrent 2D profiles can be mapped (programmed) in an A1ASC 5 and be used to direct an output that will follow or "adapt" to the changing real time temperature input as discussed in U.S. Pat. Pub. No. 2005/0278071.

Figure 7:
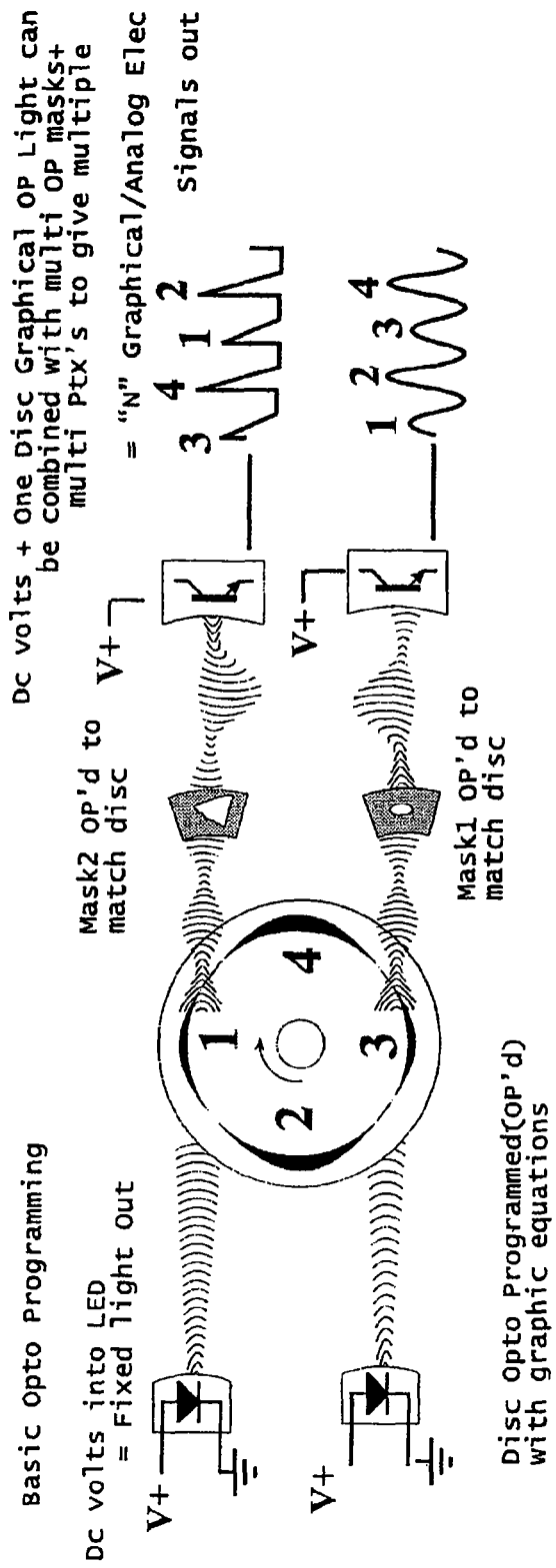
FIG. 7 illustrates co-programming of two optical signals according to another OP technique.
Figure 7:
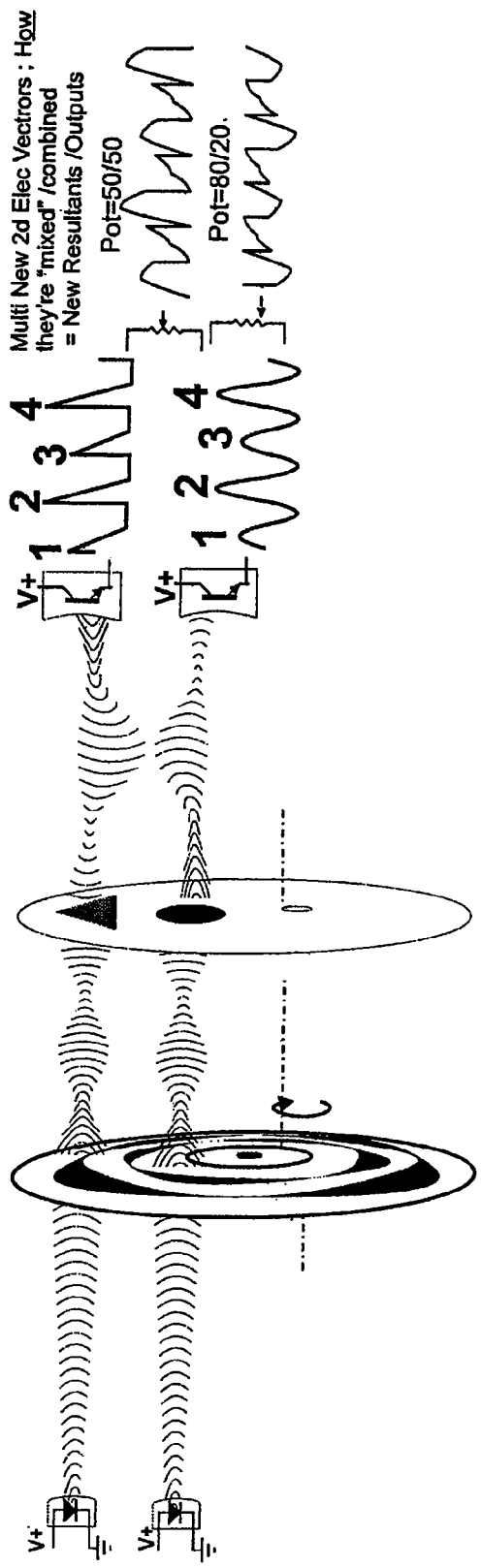

FIG. 7 references U.S. Pat. No. 5,665,965 to show the 2D wave mixing technique disclosed therein and used to generate the profiles shown in FIG. 5. As illustrated by FIG. 7 and described in detail in U.S. Pat. No. 5,665,965 a simple combination of the detector/sensor output signals using a series of resistive combinations or potentiometers can yield a variety of output signals. Based on the information disclosed by FIG. 5 and FIG. 7 it can be understood that the actual programmable relationship of temperature (BTU) input (or many or any input signals) can be mapped or profiled to a number of combined or unique vectors, integrals, algorithms, math functions, equations and the like using one or more OPPs. Thus, from each of the six shaded plots (areas marked yellow in FIG. 5) a series of plots of various patterns and profiles can be extracted from a single OPP (shaded areas marked yellow). Just as a number of digital software programs can be coded into a single digital micro processor, so can a number of analog Opto Programs can be coded into an analog Opto Processor as disclosed in the cited references. This analog parallel (concurrent) processing function is what gives OPP and A1ASC 5 such superior function and simplicity.

FIG. 8 shows a 3D plot (OP profile) of temperature and another input parameter versus output power. Note that another parameter could be any of signals received from any of the other ETSs 4 such as the humidity sensor or the gas sensor. FIG. 8 illustrates the ability and ease of multi-dimensional OPP (Opto Programmed Processor) profiles. This 3D function can likewise be configured and programmed by the A1ASC (5) as it is presently configured. The 3D or multi dimensional concept and ability of OPTO programming were disclosed and discussed in the cited patents U.S. Pat. Nos. 5,665,965, 6,087,654. FIG. 6 illustrates several figures from these two U.S. patents that feature the mixing and combining of two or more 2D profiles to create 3D profiles or functions.

FIGS. 6 and 8 also show that temperature input to power output is not always a simple straight, linear or single function or profile, and that temperature can be actively and dynamically combined in real time with other sensor input parameters to give complex functions and that they are not only stored programs, but stored data, memory and information. FIGS. 6 and 8 further show that actual 2D profile or programmable relationship of temperature (BTU) input can be mapped or combined with a 2D profile or program of humidity, pressure, motor speed, motor torque, CO2, air quality or any number of other input parameters to create unique 3D vectors, integrals, algorithms, math functions, equations and the like using one or more OPPs. Just as FIGS. 5 and 7 disclose the application of multiple concurrent 2D profiles, FIGS. 6 and 8 disclose how 3D profiles can be co-mapped (or co-programmed) with OPP and be used to direct one or more power output signals that will follow or "Adapt" to changing real time multiple parameter inputs.

It should be noted that an iTACC according to the present invention includes an indoor section 17, in which AO-FI 1 resides and an outdoor section 18 in which AO-FO 9 and AO-Comp 14 reside. Air flow between indoor section 17 and outdoor section 18 is accomplished through AO-AL 15. ANB 8 is provided in outdoor section 18 to reduce the transmission of noise from outdoor section 18 to indoor section 17. An ETS 4 is preferably provided between at least one AFA-OA 3c and HCE-O 16b in order to provide information about the condition of the outside air (e.g. temperature, humidity etc.). Furthermore, at least one ETS 4 is provided between AFA-DA 3b and HCE-I 16a to provide information about the condition of discharge air (e.g. temperature, humidity, ozone content etc.). Note that, as is schematically illustrated, AO-Comp 14 is operatively coupled to HCE-I 16a and HCE-O 16b in order to effect temperature variation as is well known in the art. As illustrated air from the indoor is brought in preferably through AFA-RA 3a and treated by AO-EAI 2. Further note that, in a heating mode, AO-FI 1 forces air past AO-EHE 13 in order to heat the same.

Figure 2B:
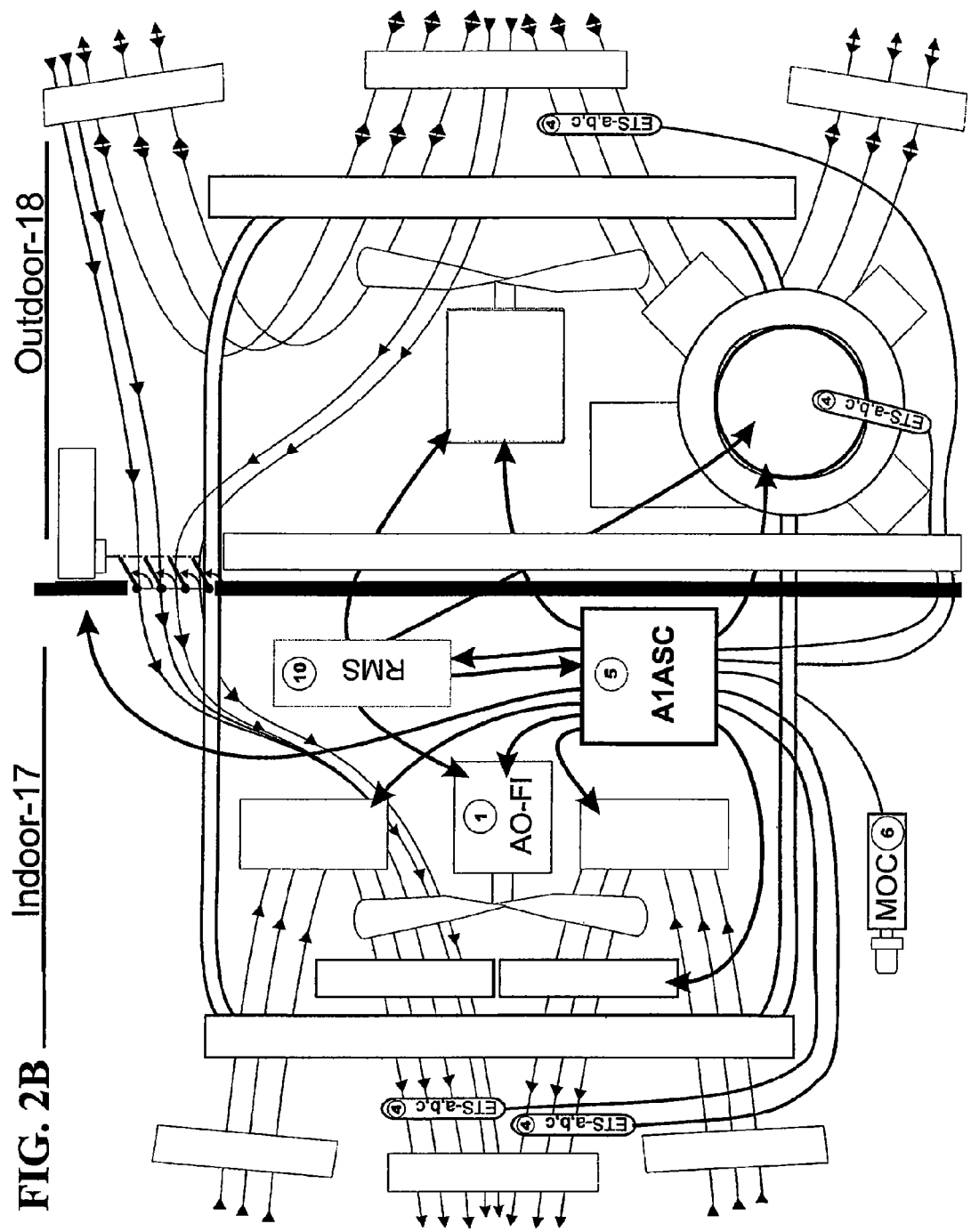
Figure 2C:
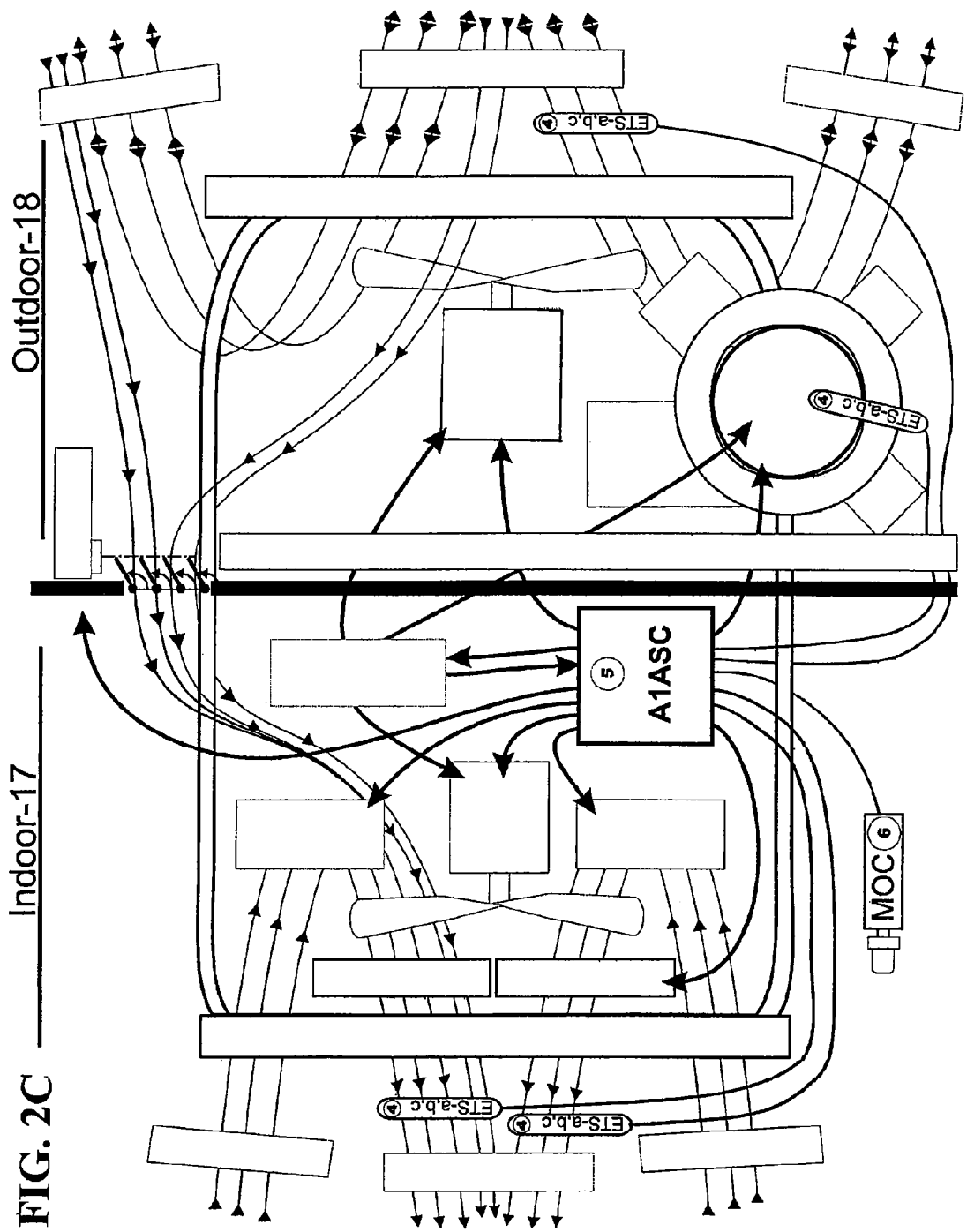

Referring to FIG. 2C, A1ASC 5 receives direct sensor inputs from ETSs 4. ETSs 4 can be a series of different types of input sensors and transducers. Suitable sensors can be environmental sensors such as temperature sensors, humidity sensors, pressure sensors and the like; air and gas sensors such as sensors to detect CO, $CO_2$, $O_2$, $O_3$, NO, HS, Radon, and the like; and sensors that can detect occupancy, speed, air flow, proximity, pressure, noise, and the like. One or more of any of these sensors (or other types) can be placed in various locations inside the iTACC as shown in the drawings or located outside the iTACC and placed in the room, around the building or across the county.

A1 ASC 5 is a closed loop optical computer. Like any computer, effective implementation involves input and output. Within A1 ASC 5 are provisions for a multitude of various simultaneous control inputs. The simplest case would involve utilizing one input with a simple thermistor sensor. There are problems with the transfer function of a single thermistor. Specifically, response times are not desirable and thermistors do not exhibit asymptotic behavior at their nominal resistance value. To make use of a single thermistor as both a hot and cold profile sensor, asymptotic behavior at the set point is crucial. The physics of standard PTC and NTC thermistors can be circumvented by configuring them in a type of Wheatstone circuit or similar bridge topology, which actually utilizes two of A1 ASC 5 inputs. U.S. Patent Publication No. 2005/0278071 discloses this topology, which is incorporated in A1 ASC 5. The Wheatstone or other type balanced bridge circuit is set to a nominal temperature, say 72 deg, and set into balance equilibrium. Any deviation from the balance, such as higher temperature or lower temperature will take the bridge out of balance and produces a signal.

Accordingly, this signal can be optically shaped independently for both the hot and cold directions, and optimized for devices like PTACs, where optimized profiles for heat and cool would be of great benefit.

ETSs converts a real world condition or parameter into some type of proportional electrical signal. A1ASC 5 would then convert this input electrical parameter into a proportional or re-programmed output power level profile (optically programmed profile or OP profile) based on optical and graphical programming principles disclosed in U.S. Pat. Nos. 5,665,965, 6,087,654, 7,204,429 and U.S. Patent Publication No. 2005/0278071. A typical OP profile can be a collection of two dimensional (2d) or three dimensional (3d) related data points (see FIGS. 3-8 for examples of both 2d and 3d profiles and graphs) used by an OPP, such as A1ASC 5, to select the proper power level required for the operation of an electrical device. Each ETS 4 can have its own OPP or the ETS signal can be combined in an opto domain (mix wave, optical, electro-mechanical energy) or in an electrical domain (parallel, series, cascade, etc) as disclosed in U.S. Pat. No. 5,665,965 (see FIGS. 4, 6, 7).

Referring to FIG. 2B, according to one aspect of the present invention, the operation of AO-FI 1 is controlled by A1ASC 5 which receives the input signals from ETSs 4, although A1ASC 5 can also be controlled by RMS 10 and/or MOC 6. The operation of a fan motor of an HVAC system based on optical and graphical programming is disclosed in U.S. Pat. No. 7,204,429, and U.S. Pat. Pub No. 2005/0278071A1. These references disclose how Opto Programmed Processors (OPPs) can accept a number of input signals $i_1, i_2 \ldots i_n$ from, for example, transducers and sensors, and produce a number of respective output signals $o_1, o_2 \ldots o_n$ to drive, for example, fan motors, dampers and compressors (see FIG. 4). The output control power signals so generated are based on one or more specific internal optical programs that produce a given transfer function for a given application to improve the system's performance.

In an iTACC according to the present invention a similar method is implemented based on the prior art with similar performance improvements. However, many added benefits, features, performance enhancement and expansions are achieved when the methods disclosed in U.S. Pat. No. 7,204,429 and U.S. Pat. Pub. No. 2005/027807, are applied to a PTAC.

As disclosed in the cited prior art, a fixed or two speed indoor fan or blower in an HVAC system can be made into a continuously variable speed or "Adaptive/Intelligent Speed" motor with an OPP. An ordinary PTAC typically includes a fixed or two speed electric fan or blower motor. In an iTACC, AO-FI 1 is given a new intelligent, smart, programmable or "Adaptive" capability by driving and powering it with A1ASC 5. Like the prior art there are improvements in the fan's operation, but as disclosed below, there are added performance benefits because of the fan upgrade that directly offers many new HVAC system options, improvements, efficiencies and upgrades unique to a PTAC. Some of the advantages include: better air filtration and cleaning both indoor room air and outdoor air pulled into the PTAC, air climate conditioning performance enhancements, electric energy efficiency increase, lowered noise, and reduced compressor cooling and heating demand. As will be understood, any HVAC system like a PTAC system that performs both heating and cooling using similar base elements, i.e., an indoor fan to distribute heating or cooling and an outdoor fan to help effect it, can benefit from the invention disclosed herein.

Figure 2D:
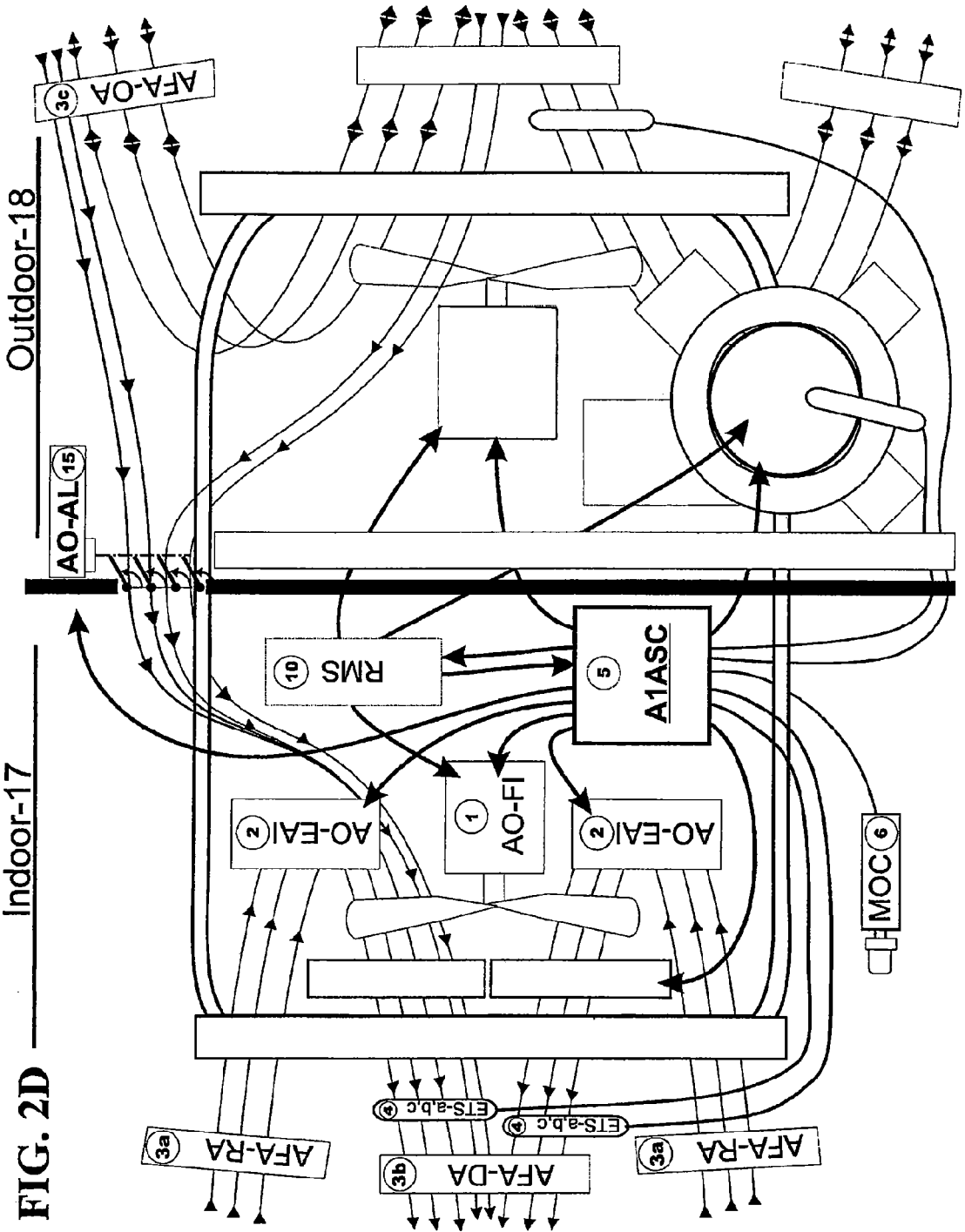
Figure 2D:
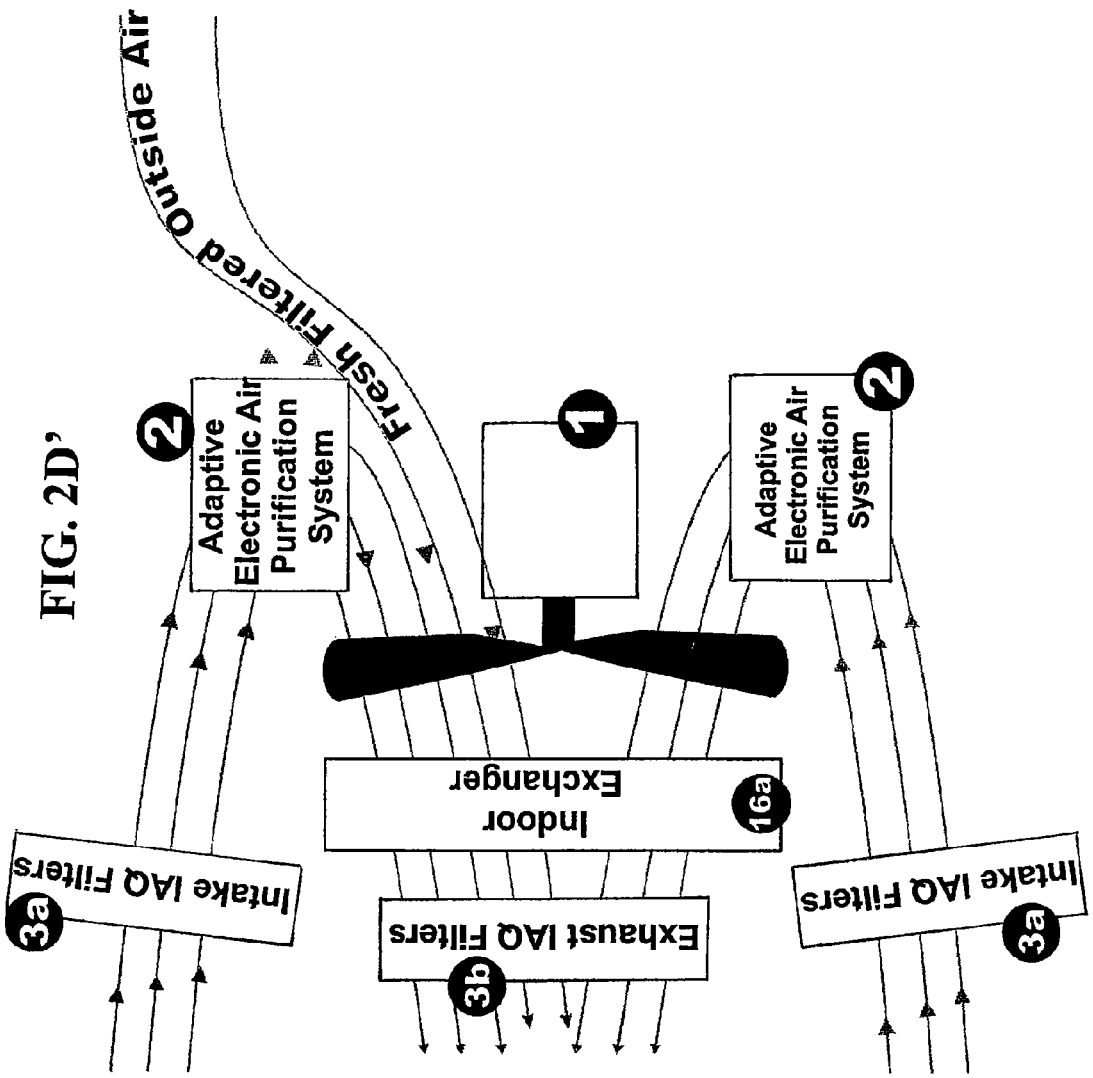
Figure 2D:
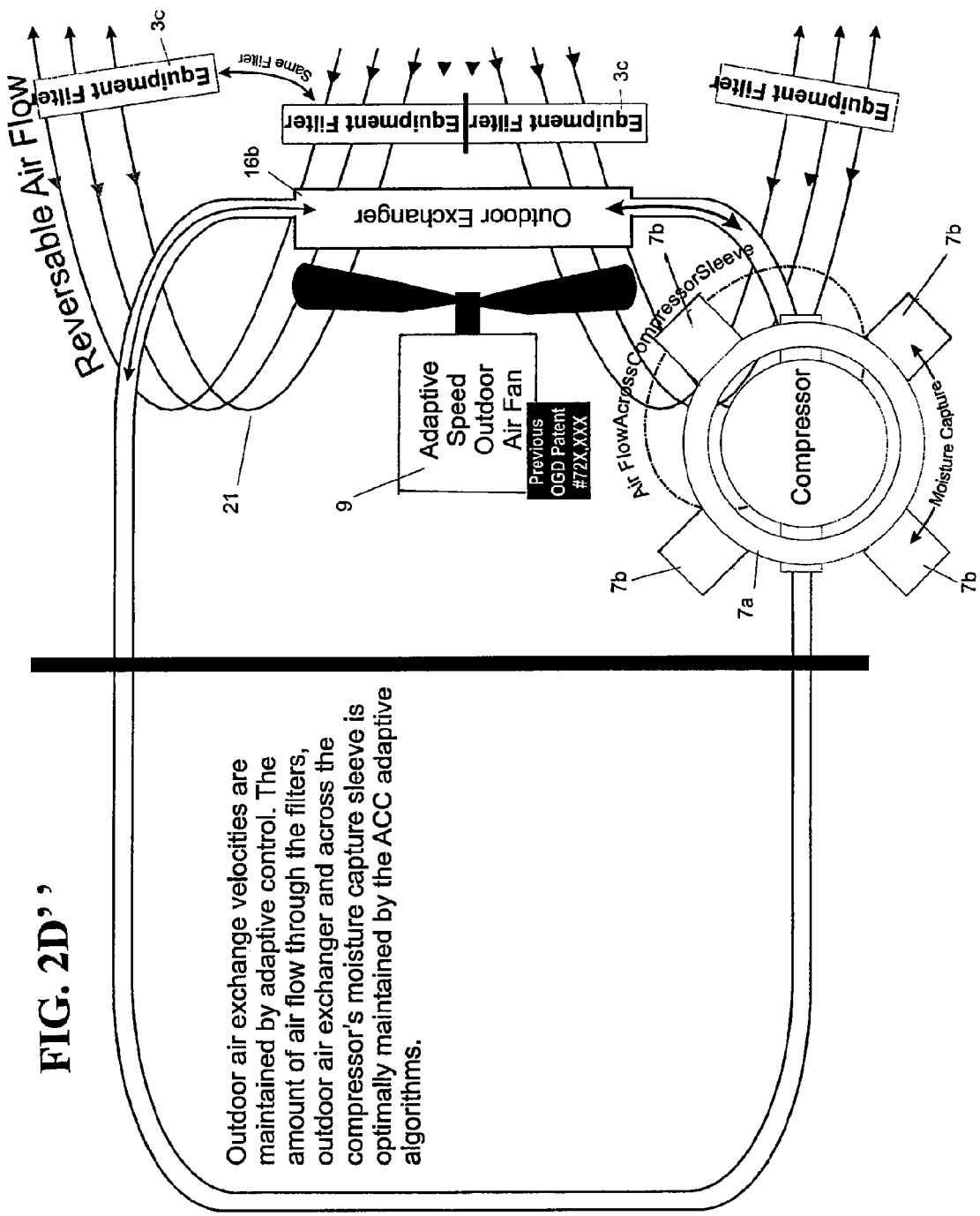

FIGS. 2D and 2D' illustrate the combination of features in an iTACC that allow for the realization of a unique air filtration and cleaning arrangement, which can be applied to any fan based HVAC system. AFA-RA 3a is used to filter and clean any and all room air (RA) returning to indoor section 17 of the iTACC, while AFA-DA 3b is used to filter and clean any and all discharge air (DA) from the ITACC. AO-EAI 2 ionizes and also cleans any and all iTACC room DA which is received from AFA-RA 3a. AO-EAI 2 can have its own separate OPP (residing in A1 ASC 5) controlling its output or it can work in tandem with, or powered by, the same OPP (residing in A1 ASC 5) for AO-FI 1. AO-AL 15 provides adaptive outdoor air flow to also be filtered and cleaned through AF-OA 3c. ETSs 4 provide the low power signal inputs to the OPPs in the A1ASC 5. Each OPP has algorithms that convert low power input signals into proportional high power outputs. AO-FI 1 provides adaptive air flow (AAF 19) to enable AO-EAI 2, AFA-RA 3a, AFA-DA 3b and AO-AL 15 to effectively achieve their functions; while A1ASC 5 provides the Adaptive Power Output-AO to items (1), (2), (10), (15). MOC 6 can be used to manually override the Adaptive Air Filtration and Cleaning features.

A basic problem with high voltage based ionization air purification techniques is that, similar to the many other two state on/off devices in many HVAC systems, there is no variability of levels. This on/off only ionization coupled with the fan high speed or fixed on/off air velocities can yield undesirable ozone emissions. Thus, for example, air velocities above 600 CFM may not allow for effective high voltage based ionization air purification techniques without raising ionization voltages to the point of also causing ozone creation. Lowering the fixed maximum ionization voltage level can lower ozone creation at these higher speeds but at no or too low an airflow, without lowering the ionization voltage, can still cause an excess concentration of ozone. Creating the proper ionization balance with only a full on/off fan and likewise full on/off ionization voltage system is quite difficult and a major impediment to effective operation in a standard PTAC.

According to one aspect of the present invention, Adaptive power control is applied to the ionization electronics (AO-EAI 2) by A1 ASC 5 to provide a variable voltage ionization level matched or suitable for a specific airflow effected by AO-FI 1. AO-EAI 2 is operated so that its ionization output is optimized relative to the air flow effected by AO-FI 1. Also, by integrating an A1 ASC 5 into a PTAC, air velocity is managed and controlled to obtain continuously varying airflow as well as air velocities much lower than air velocities attainable by a standard PTAC. More specifically, by using A1 ASC 5 according to the present invention, air velocity can be reduced to as low as 100-600 CFM. As a result, air purification using an adaptive and variable ionizer AO-EAI 2 becomes effective. Thus, according to one aspect of the present invention, electronic air purification circuitry is rendered adaptive, whereby balances between air velocities and ionization voltages are controlled and maintained intelligently and adaptively by A1 ASC 5. In addition, in an iTACC, if any ozone is produced in the exhaust air stream some can be captured by the secondary discharge air filter AFA-DA 3b further limiting ozone to a fraction of the FDA's 50 ppb ozone limit for air ionization products. Also an ETS ozone sensor placed in the discharge air flow could likewise detect ozone and through the A1ASC 5 throttle back the voltage ionization levels as needed.

The Adaptive Ionization feature of the present invention is not limited to PTACs, and can be extended to all HVAC moving air systems, heat pumps, split systems, forced hot air furnaces, central ac system, variable air volume apparatus, fan coils, and the like.

Another benefit of a system controller A1 ASC 5 according to the present invention is that it adjusts motor (both the indoor, AO-FI 1, and outdoor, AO-FO 9, fans) speed in proportion to control inputs and mechanical static load, which means that a clean air filter and a partially contaminated air filter will not stop the adaptive air flow ramp up/ramp down function and other benefits. Specifically, for example, if there is less air moving across the cooling or heating coil than the coil's Btu output requires then its temperature change will accelerate (increase/decrease faster). This in turn will cause a faster change in the discharge air temperature, which will be sensed by the A1 ASC 5 discharge air sensor ETS 4 that resides in the path of the discharged air and will cause the A1 ASC 5 to accelerate the speed of AO-FI 1 accordingly, keeping the air flow to Btu flow in balance. Thus, even in less than ideal system conditions A1 ASC 5 can adapt and perform some system correcting and help lessen some of these operating issues.

In an iTACC according to the present invention, air filters are preferably selected to complement the adaptive speed capability and adaptive electronic air filtration module. The intake filter, AFA-OA 3C, is preferably chosen to perform general air filtration throughout the air velocity range. Most newer type treated high density air filters designed to improve Indoor Air Quality (IAQ) (hepa type and others) that are capable of effectively reducing indoor room air contaminants such as dust, spores, pollen, mold, mildew, smoke, and the like, work better when air flow is continuous but are much improved when the air flow is continuously adaptive and gradual. Thus, a high filtration density air filter is most preferred for use in an iTACC according to one aspect of the present invention.

Most standard PTACs possess intake air filters, which are mainly implemented to protect the equipment, control some contamination buildup on the coils, and to minimize any air flow restrictions. These filters do minimal to nothing to aid in improving IAQ (Indoor Air Quality) for the room occupants or room air space. Simply putting in special high density air filters in standard PTACs is not always a viable option. A standard PTAC already does not always maintain temperatures well in the controlled occupied space. Studies show, dramatic temperature fluctuations occur under normal PTAC operation (+/−5 degrees from set point). The problem occurs when, for example, the room needs to be heated (or cooled). The system only has 3 main states: off, med, hi (where med=hix90%) and no gradual ramp temperature adjustability. It would not be practical to further impede the performance of a conventional PTAC by adding any air filtration apparatus without any equivalent air flow adjustment.

An iTACC according to the present invention, maintains the temperature level in a room within a degree or 2 of set point. So the upgraded PTAC=ITACC with such tight temp control, never really "gets behind or ahead" its heating or cooling task. As the heating or cooling capacity output changes so does the iTACC discharge air flow to match and optimize the Btu transfer. Depending on which mode the iTACC is in (heating or cooling) the OP algorithms can be profiled to fit or match such that they optimize the output air flow ramp for increasing (heat mode) or decreasing (cool mode). An iTACC according to the present invention performs this function automatically without any need for user intervention. Thus, in one preferred embodiment, within the adaptive programming strategy, there can be a performance dynamic in "filtration mode" (like an idle speed), which allows air velocity to be reduced to 100-600 CFM where air filtration becomes much more efficient and effective, yet room temperatures are better maintained. Further, the slower air velocities that ramp to full speed smoothly and gently instead of an abrupt full on, dramatically increase the effectiveness of the filter's performance. To summarize, the capability to continuously and adaptively vary the air flow through the continuous and adaptive operation of AO-FI 1 by A1 ASC 5 allows for a more effective use of the filters in an iTACC.

Figure 2E:
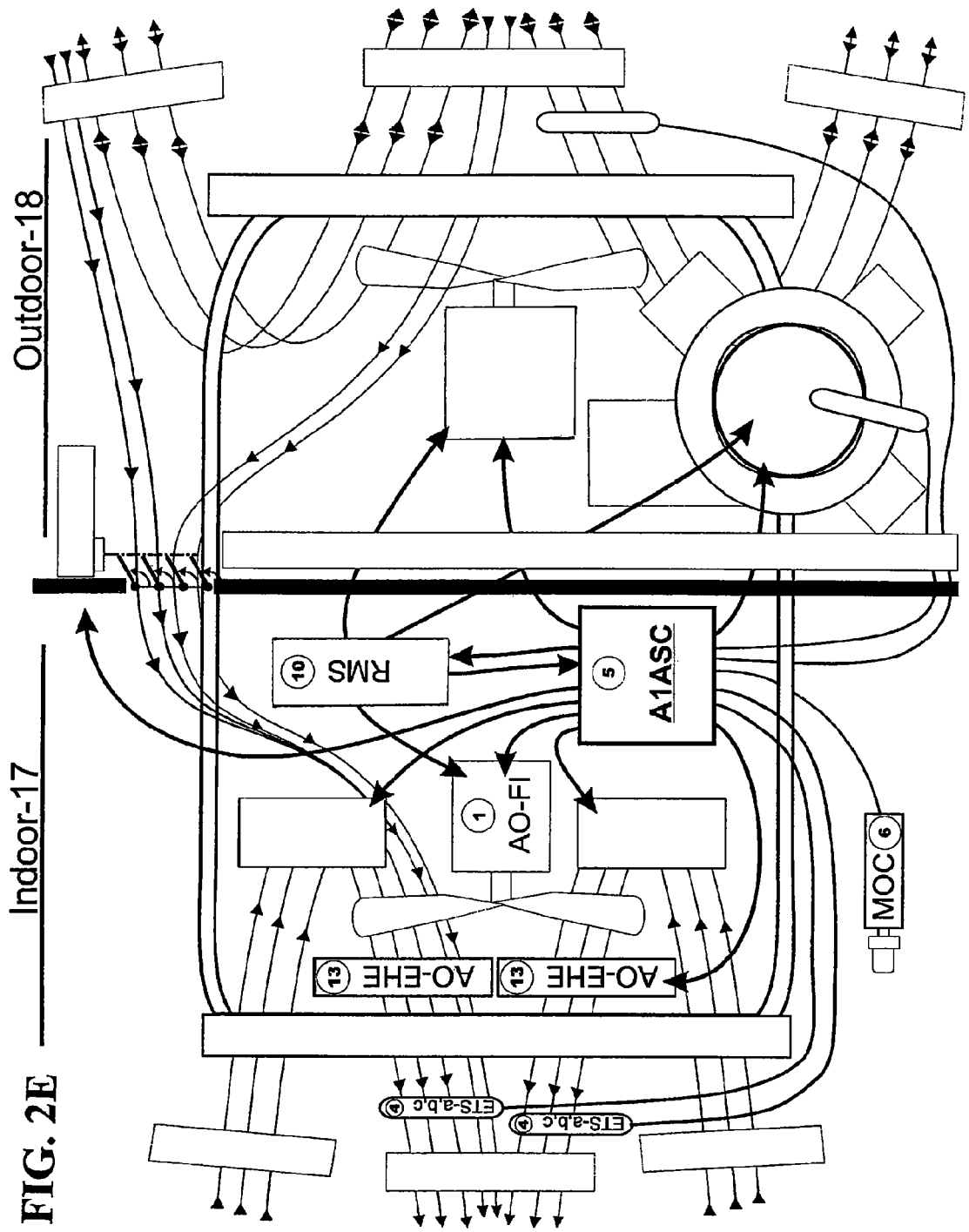

Referring to FIG. 2E, OPPs in A1ASC 5 are utilized to vary and "adaptively" control AO-EHE 13 and maintain sympathy and balance with the indoor fan AO-FI 1. This can be done by directly powering AO-EHE 13 only when heat is needed in the same manner ac power is supplied to AO-FI 1. So both AO-FI 1 and AO-EHE 13 would be operated in tandem and powered to ramp up and down. AO-EHE 13 could be directed by its own separate OPP in the A1ASC 5. This could be from a secondary input item ETS 4 into A1ASC 5 dedicated to driving the heating elements based on their own OP heating algorithm. In any and all cases, the goal is to optimize and match indoor fan air-flow with heat BTU output capacity to achieve improved AO-EHE 13 efficiency and performance.

Augmented heat PTACs include, in addition to the heat pump function, electronic heater core element(s) which supplement the compressor in the heating mode. These heater elements, like the motors, are 2 state devices: ON/OFF.

Further, in a conventional PTAC, after the heater core has been energized, and at the time power to the core is switched off, the PTAC fans themselves continue to run full speed, but do not efficiently extract heat from the core and cause premature cooling of the core resulting in inefficiency.

The amount of heat transfer to a given occupied space is optimized when the rate at which heat leaving that occupied space is equal to the rate at which it is being replenished. A heater element, that is full-on or off, cannot effectively match this rate. Further, to effectively dissipate heat, while maximizing the efficiency of heat generated by the heating elements, requires a process of simultaneous optimization of air-flow rates and thermal considerations that vary in accordance with the demand at any given instant (a differential value), while manipulating the quantity of heat capacity available on the heater core at any given instant (a second differential value) to simultaneously compensate for both air flow and heat capacity. Mathematically this is modeled by a 2nd order differential equation, which can be realized and computed by an OP algorithm within A1 ASC 5. The adaptive motor control capability of A1 ASC 5 alleviates this problem by gradual acceleration/deceleration of the fan motors in sympathy with the sensor, global system, and other various control inputs, all mixed and computed optically. That is, A1 ASC 5 can operate AO-FI 1 so that the rate of heat extraction due to the air flowing past AO-EHE 13 is closely matched to the heat output of AO-EHE 13, rendering the heating operation thereof more efficient.

Figure 2F:
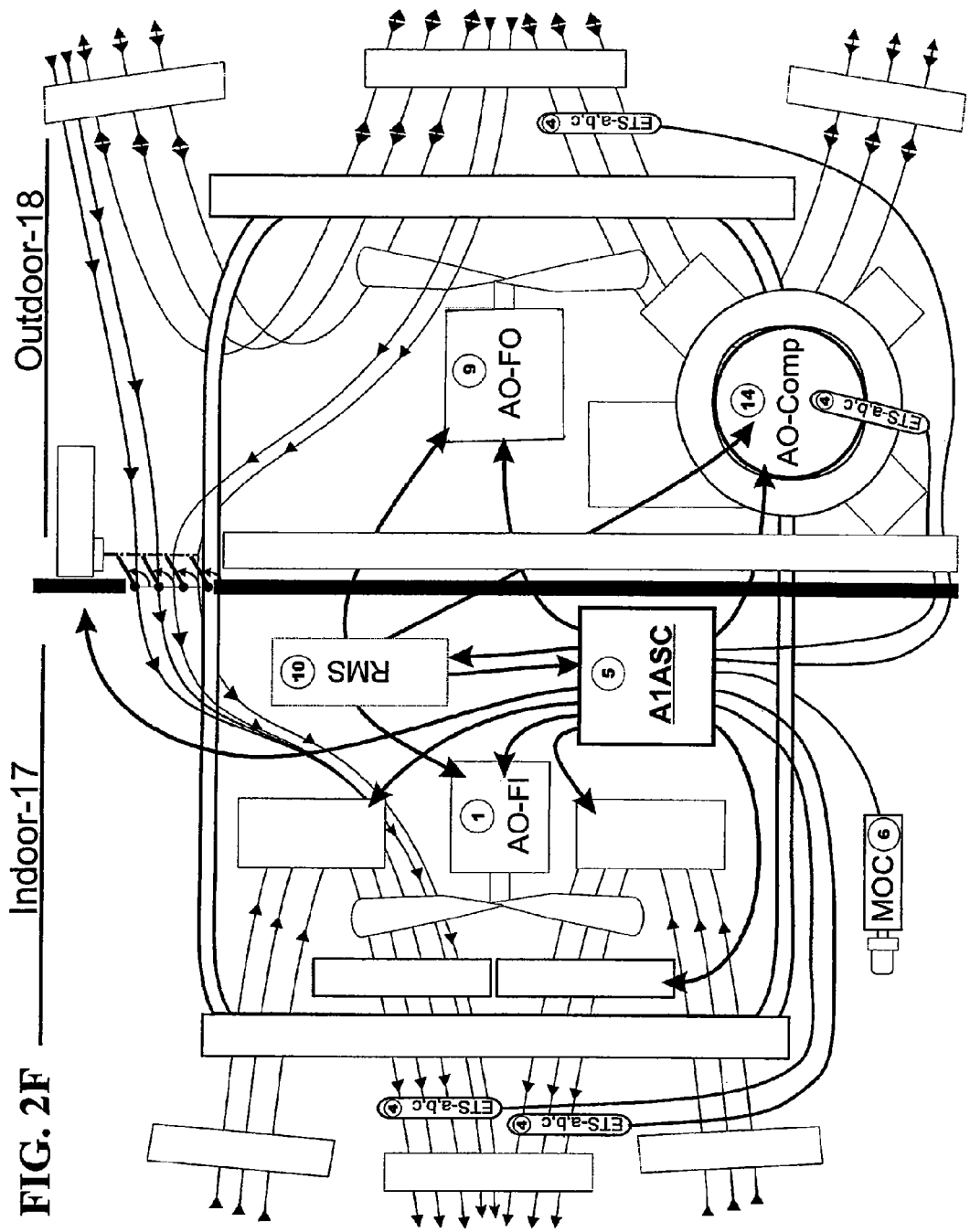

FIG. 2F illustrates AO-Comp 14 arrangement of an iTACC according to the present invention. FIG. 2D" highlights the isolated sections from FIG. 2A disclosing and detailing the main features and elements for Adaptive Speed Compressor control for both compressor heat pump heating and compressor cooling. As explained earlier, an internal OPP (Opto Programmed Processor) in A1ASC 5 has built in algorithms that are utilized to continuously and variably control the compressor motor's speed. This directly impacts the compressor's pressure and temperature output which in turn controls and determines its heating and cooling rate. The OPP control for AO-Comp 14 could be in tandem with AO-FI 1 output speed and power, or it could be through a separate ETS 4 (sensor) input (e.g. input from a pressure sensor) into A1ASC 5 and a separate power output from A1 ASC 5 to the compressor. In both Air Conditioning mode and Heat Pump mode AO-Comp 14 can shift into a Smart, Intelligent Adaptive Climate Mode as opposed to a simple on/off mode as most HVAC compressors do. In the Intelligent Adaptive Climate Mode, AO-Comp 14 is continuously adaptively adjusted and operated as opposed to being shut off and then started again. Thus, the output of AO-Comp 14 can be continuously varied according to an OP profile (e.g. a 2D or a 3D non-linear profile resulting in significant system performance).

Figure 2G:
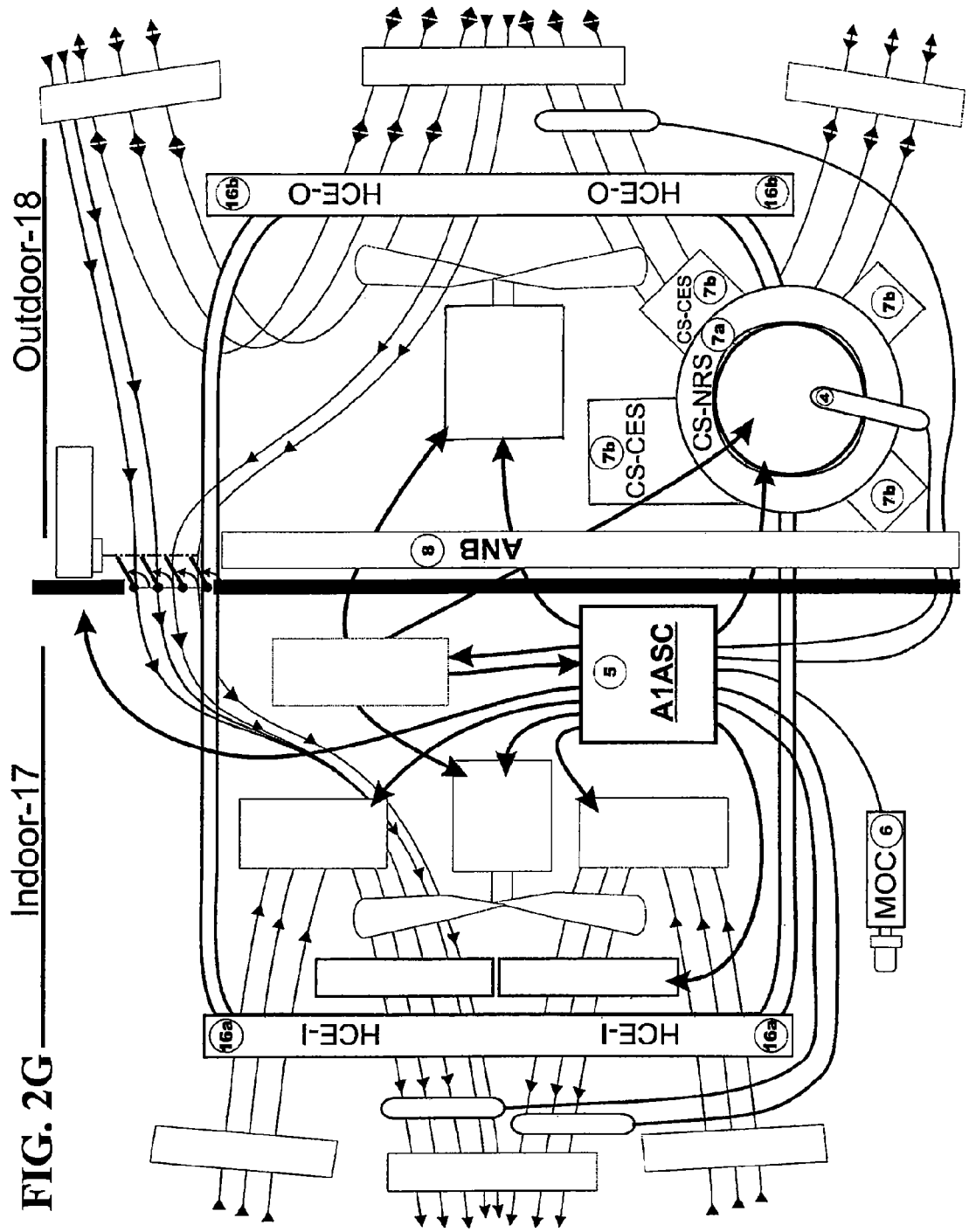
Figure 2G:
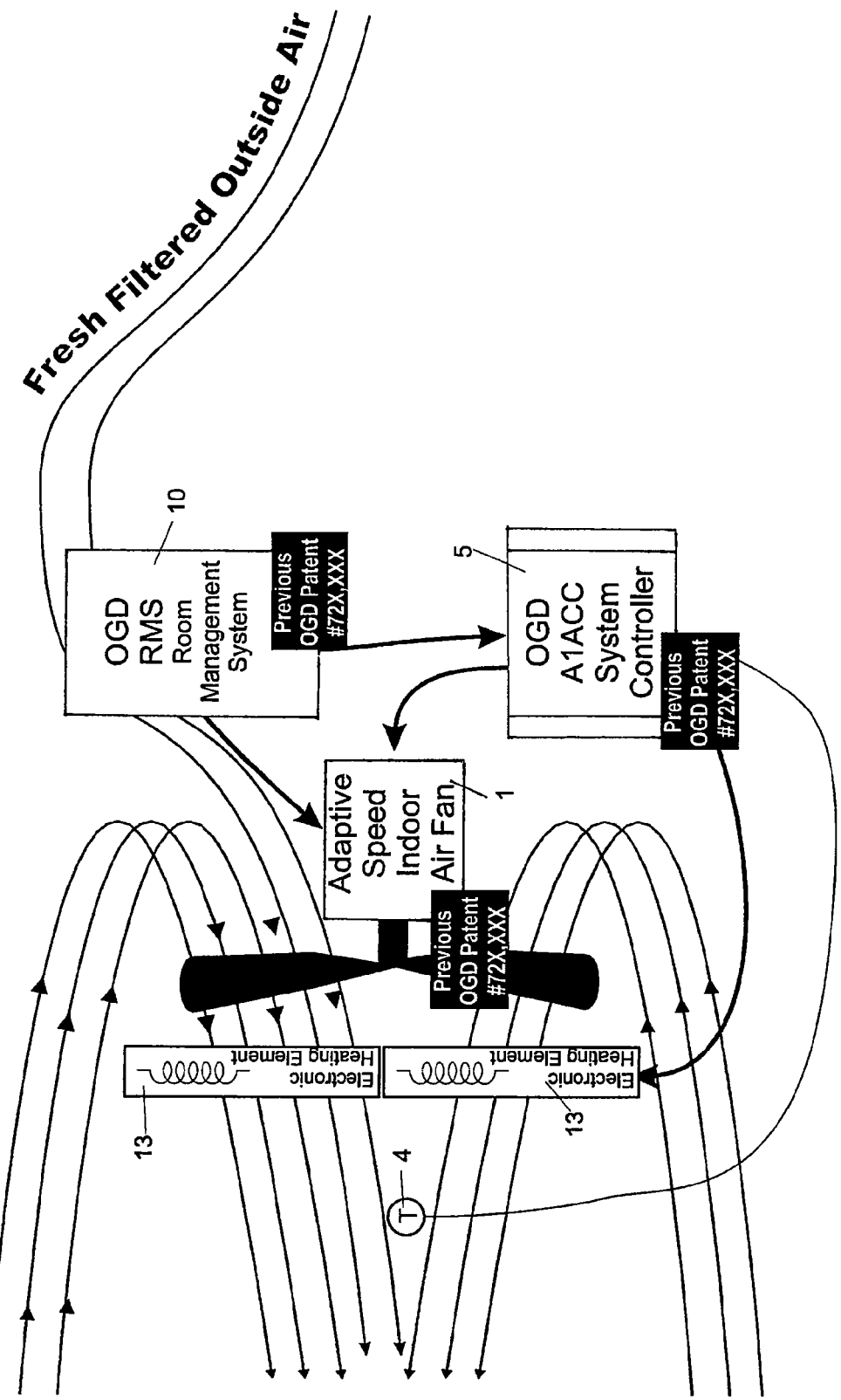

FIG. 2G and FIG. 2G' illustrate HCE arrangements of an iTACC according to the present invention. FIG. 2G calls attention to the full Adaptive nature of the entire heating and cooling system within iTACC. It shows all the active electrically powered elements (items: 1, 5, 6, 9, 10, 14, 4) and the active thermally powered elements (items: 16a, 16b). These thermally active elements, HCE-I 16a and HCE-O, are not two state devices. Rather, they have a ramp up/down rate in thermal transfer and as such become more efficient and effective when the air flow on them is also not two state. The placement of ETS 4 temperature sensors in their discharge air flow will sense and track the thermal (BTU) output and then input this info into the A1ASC 5 where an appropriate OPP will convert this to a matched and Adaptive air flow effected by AO-FI 1. Consequently, HCE-I 16a and HCE-O 16b reverse thermal roles and go from absorbing heat to creating heat, so evaporator and condenser roles reverse.

Figure 2H:
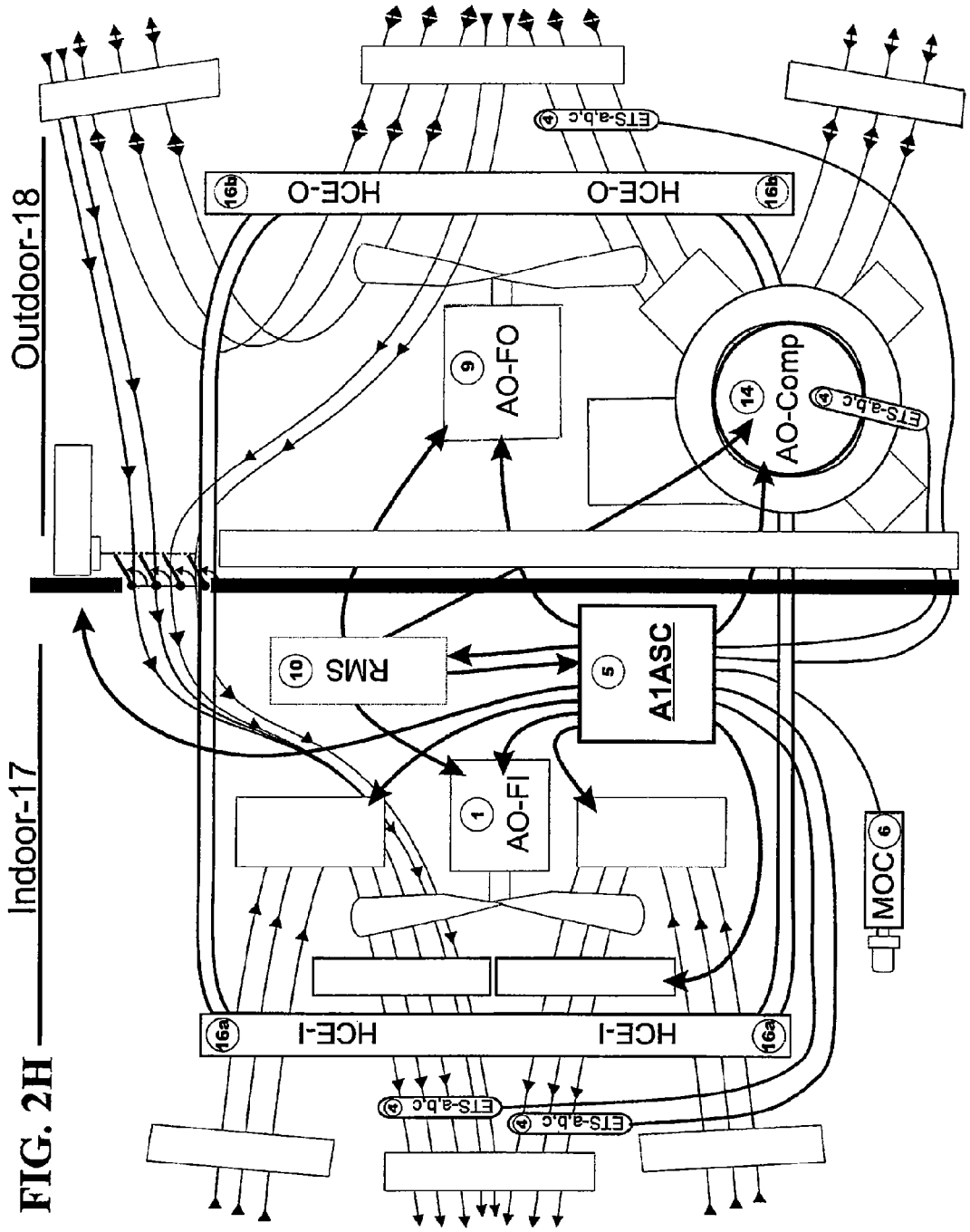

Often the compressor can be one of the largest contributors of PTAC noise. In a conventional PTAC, noise production of 3 motors running at full speed is an issue that is simply accepted and not addressed. Quieting its operation without altering or harming its function is another aspect of an iTACC according to the present invention. FIG. 2H illustrates the CS-NRS 7a and ANB 8 arrangements of an iTACC according to the present invention, which help to minimize and reduce the noise from AO-Comp 14 and AO-FO 9, by far the two loudest noise sources. The combination of CS-NRS 7a and ANB 8 noise dampers along with the Adaptive (lower) speeds of the outdoor fan AO-FO 9 and AO-Comp 14 significantly reduce noise for the room occupants as well as for the outdoor neighbors. CS-NRS 7a has an added function and feature besides noise reduction, which is described below as CS-CES 7b as well as highlighted in FIG. 2I.

Figure 2I:
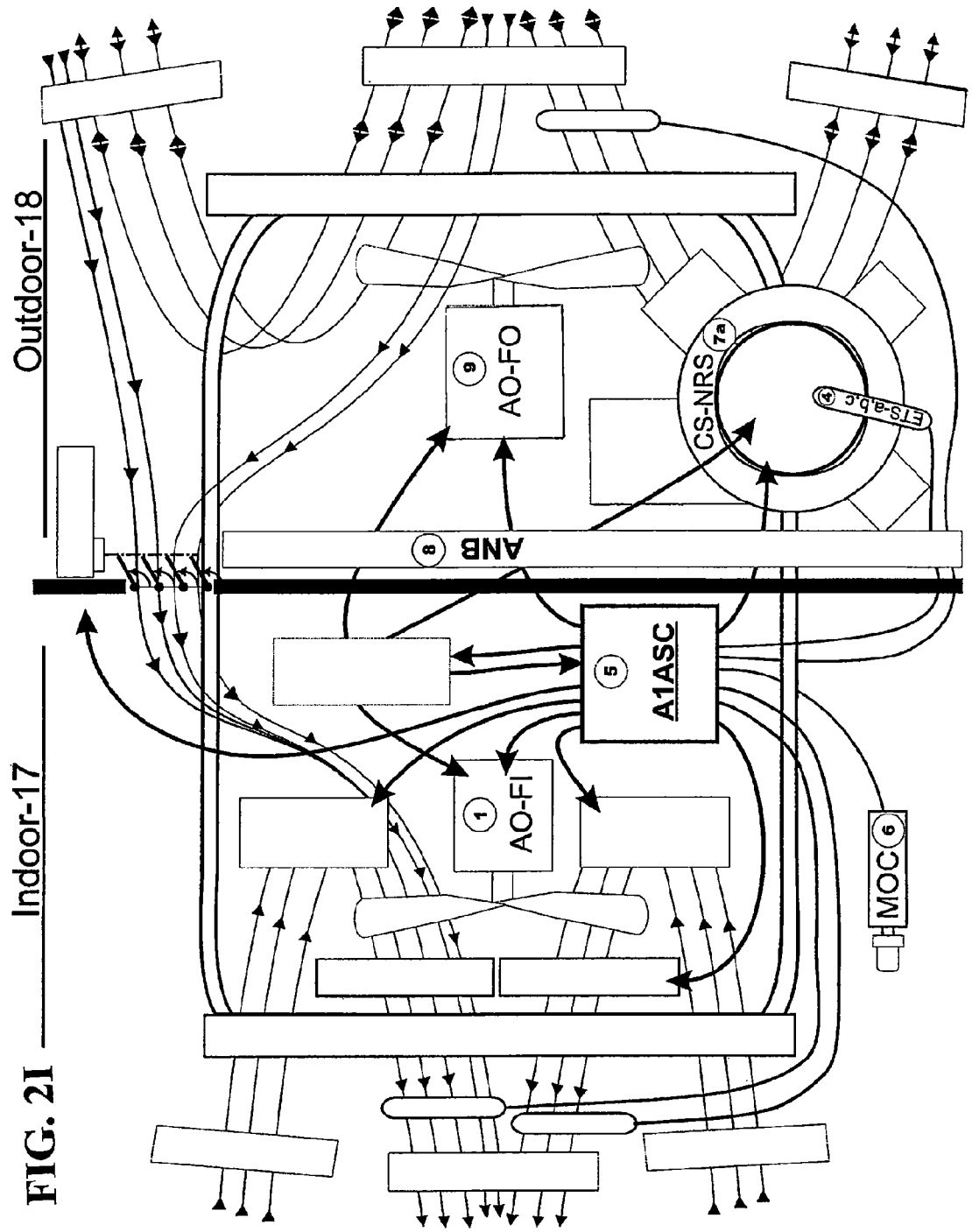

Moisture, condensate or water collection, build up and its removal in the outside water pan is a well known and awkward PTAC problem. Pan drain kits, overflows, special Outdoor fan blades are known ways used to get rid of the water or moisture. FIG. 2I illustrates CS-CES 7b arrangement of an iTACC according to the present invention. CS-CES 7b is made of a foam like material such as weather stripping or sponge material that not only will absorb noise, but will also absorb moisture. Thus, CS-CES 7b removes pan collected water and moisture to accomplish a second function as well. How does it capture the pan water and then what does it do with it is below.

CS-CES 7b has "feet" or sleeve extensions that lay in the bottom of the condensate pan where the moisture and water would collect. The sponge absorbent like feet will absorb or actually wick up the moisture from the pan. The wet feet are also connected or part of the sleeve (i.e. unitarily integrated with sleeve) (see NRS), which is around the compressor. As CS-CES 7b wicks up the moisture into the sleeve and the sleeve gets wet the compressor heat and the airflow across the CS-NRS 7a will evaporate the moisture. Consequently, CS-CES 7b will continue to wick up still more moisture into the sleeve to replace the evaporated moisture. Much like a sponge or siphon CS-CES 7b pulls moisture up out of the pan of the iTACC, whereby it is evaporated into the airflow going across the compressor from the outdoor fan (AO-FO 9). In addition to creating this sponge-like evaporative drying moisture transfer, CS-CES 7b also creates a measure of evaporative cooling helping to keep the compressor cooler and more efficient and better noise dampening as well.

Thus, according to another aspect of the present invention, compressor jacket (CS-NRS 7a and CS-NRS 7b) is made of a sleeve material (which preferably exhibits sound damping characteristics), that is capable of siphoning and wicking up water from the condensation pan, is wrapped around the compressor and placed in contact with the water in the condensate pan in order to wick up water from the same. Thus, the water that is wicked up by the sleeve can cool the compressor and also reduce noise. A suitable material may be more foam like than sponge like. A possible suitable material may be weather stripping. The "compressor sleeve" when placed over the compressor assembly and extended into the moisture collection pan, the moisture collected is evaporated off quickly by the heat of the compressor. Furthermore, if the compressor is positioned in the outside airflow intake stream, air moving across the sponge will help to evaporate the moisture therein both to cool the compressor and to help disperse and absorb the pan collected moisture into the exhaust air flow.

The Liquid Cooled Sleeve also becomes a noise reducing agent. That is, whenever the compressor is operating, this special sleeve not only helps lower its noise but can help it stay cooler and absorb and eliminate pan condensate. After retrofitting a PTAC with an A1 ASC 5, it was found that noise levels of all the fan motors were reduced to manageable levels. The new sound dampening sleeve helps to lessen compressor noise as well as reduce cycles and compressor on-time.

To summarize, the sleeve or jacket (CS-NRS 7a and CS-CES 7b) helps achieve several functions for the iTACC. It absorbs, wicks up and evaporates the collected PTAC pan moisture into the exhaust air helping to eliminate a big PTAC drawback, namely water removal. A "wet or moisture" laden sleeve is a better compressor noise dampener and at the same time this wet evaporation effect helps to avoid the CS-NRS 7a sleeve from becoming a "blanket" to the compressor and actually helps cool the compressor. So these are two novel functions in one package: 1-reduce noise (7a); 2-cool the compressor and remove humidity/condensation collected in the PTACs outside moisture collection pan (7b).

Figure 2J:
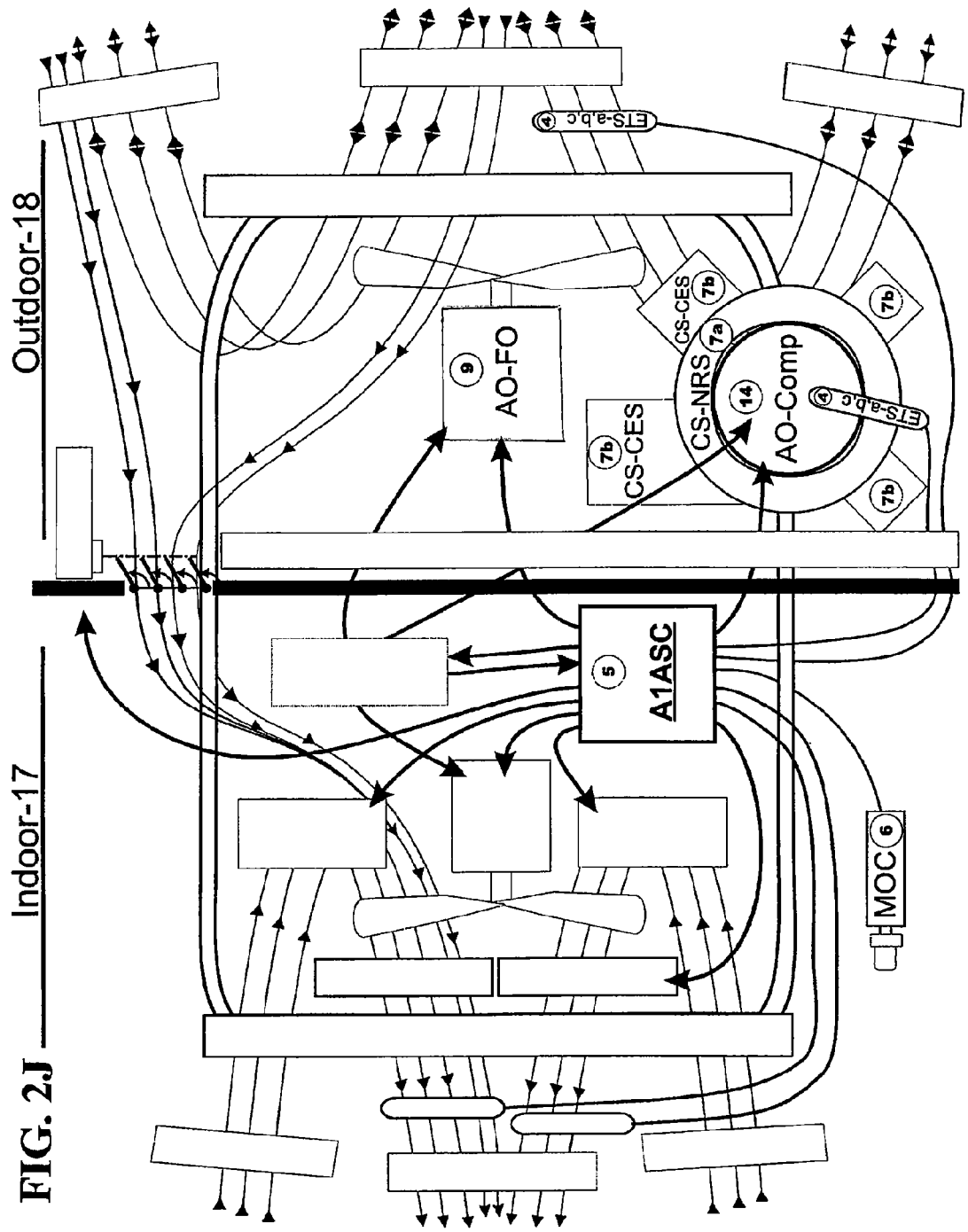
Figure 2J:
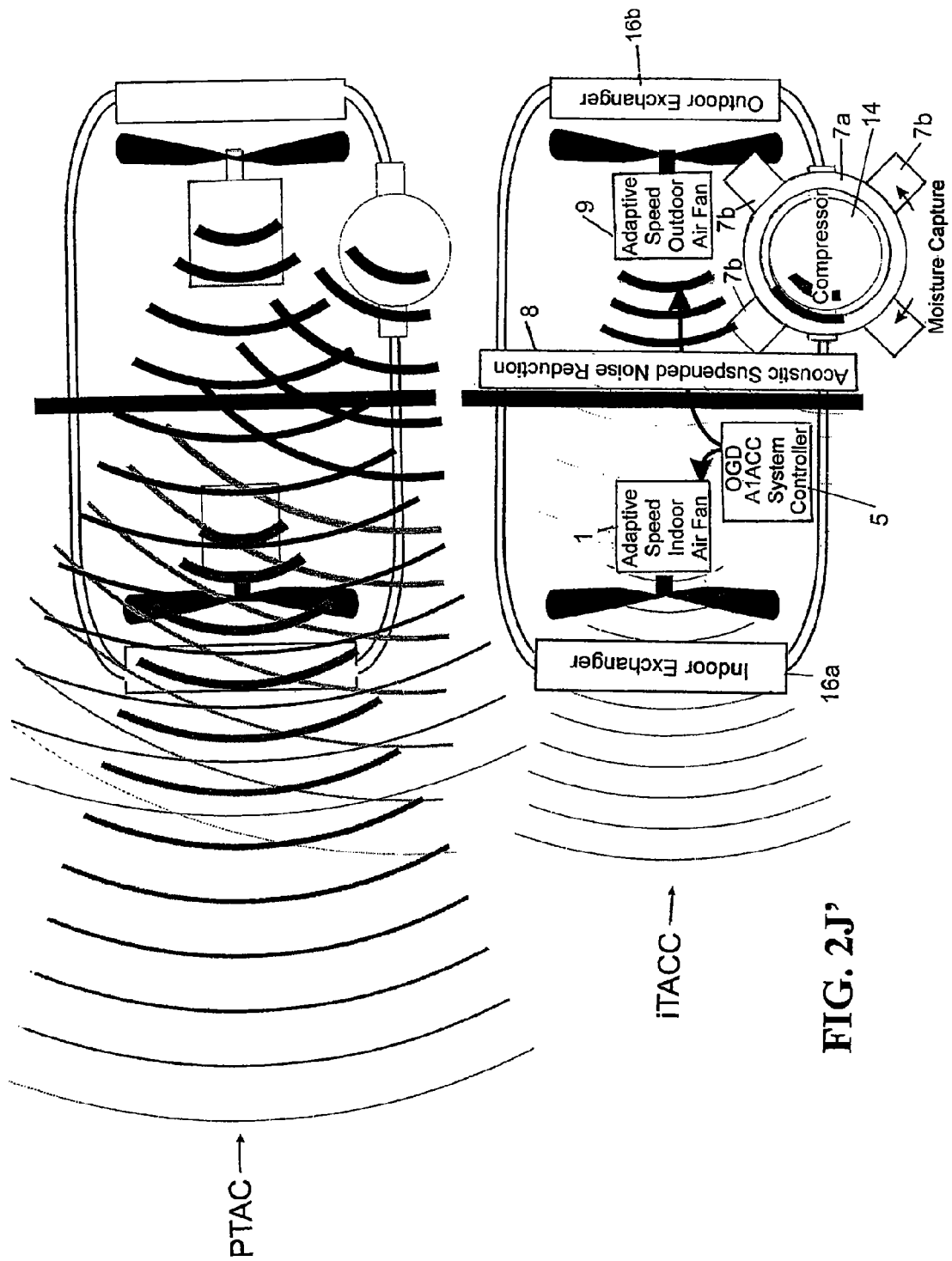

In addition to the above control features, another aspect of an iTACC is to "reverse" the fan airflow from "pushing air into the condenser coil (Outdoor heat exchanger HCE-O 16b)" to "pulling air across it". FIG. 2J illustrates AO-FO 9 arrangement of an iTACC according to the present invention. FIG. 2J discloses a novel approach to the outdoor fan in addition to making it "Adaptive" and intelligent. Specifically, FIG. 2J discloses reversing the fan airflow direction to "pull versus push" the outside air. By reversing the airflow a number of airflow improvements can be obtained through and over the outdoor heat exchanger HCE-O 16b. As illustrated by FIG. 2J', pulling versus pushing high speed air against the face of the coil (HCE-O 16b) helps eliminate back pressure, standing waves and inefficiencies that are caused by "pushing air against" versus "pulling air through" a coil. This also helps decrease air flow gaps, hot spots and interference that often occur across the coil with high speed fan air blowing directly against the coil. This reversing should in itself allow for much less air flow to achieve much better coil heat transfer and thus allow lowering the amount of overall air needed to achieve similar results. Furthermore, controlling the outdoor fan to realize a much lower but proportional air flow gives a much more efficient, less turbulent air flow through, and heat transfer for the coil. Further noise reduction and efficiency can be realized by replacing the rotary fan with a squirrel cage type blower assembly. An iTACC according to the present invention includes outdoor air filters AFA-OA 3c on the sides of the coil equipment HCE-O16b. The outdoor air filters serve well in standard outdoor fan air when the fan is blowing in the traditional way "pulled in on the sides and pushed out through the coil". However, as noted above on the outdoor fan air flow, when the direction is reversed these filters need to be moved from the sides of the coil to the face of the coil. When the air is being "pulled across the coil" it will serve a role similar to the standard role of the filters on the evaporate coil.

Most PTACs have simple fixed opened or closed outside air dampers or louvers. An iTACC may use a dynamic, adaptive louver AO-AL 15 that can be set to a preset opening and will respond to and close with increase in airflow. AO-AL 15 can return to the preset opening once the system defaults back to low idle speed allowing and bringing in outside air but at a minimum flow level keeping "fresh air" but not too much into the room. Another object of this invention is to link the damper function to thermal activity with a user controlled switch that couples its function such that when the compressor or heater is powered the damper is opened and when they are not operating the damper closes. Another option is to have the louver controlled by the air velocity going over it. As A1 ASC 5 can cause a changing air flow, it will pull on outside air across the louver. This could provide variable louver openings proportional to the air flow with a retaining spring tension. Finally, if preferred, the louver can also be fixed open or closed.

Figure 4:
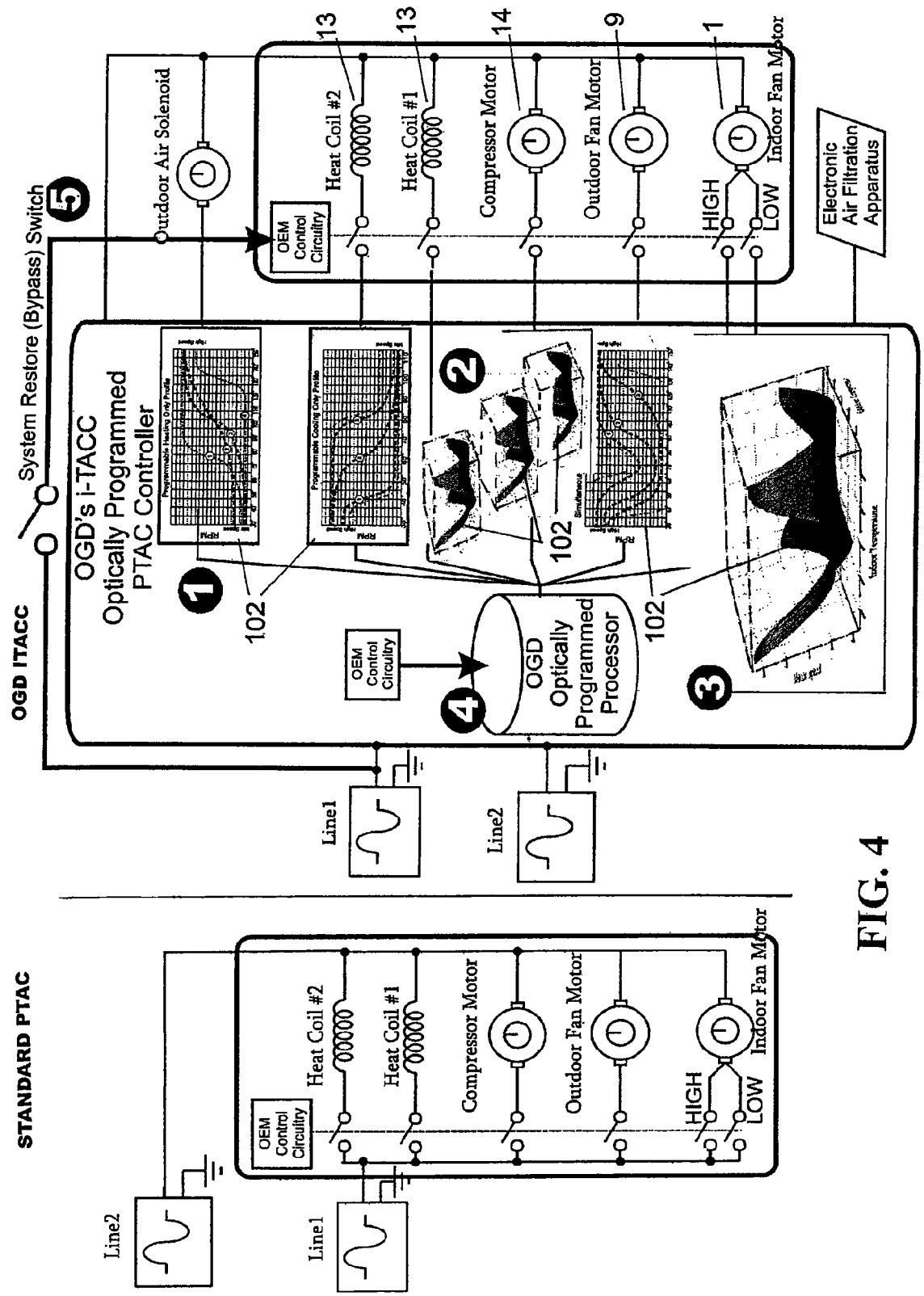
FIG. 4 illustrates the application and functional differences between a conventional or standard PTAC system and an iTACC according to the present invention.

FIG. 4 illustratively compares a PTAC topology to an iTACC topology. Thus, a PTAC comprises of an OEM control circuitry 100 that can switch power on/off to various electrical devices (e.g. heat coil, fan motor, compressor motor, etc.) in discreet steps. On the other hand, as illustrated in, in an iTACC, an OPP 102 employs various OP profiles (2D and 3d) to operate the electrical devices (e.g. fan motor, heating coil, compressor motor etc.). As explained above, the OP profiles allow for continuously adaptive operation of the electrical devices in a nonlinear manner which leads to the efficient operation of the iTACC.

FIG. 4 helps summarize the many concurrent 2D, 3D or ND (multidimensional) functions that any OP upgraded HVAC system can achieve. It is this overall "Intelligent, Adaptive, Real-time, parallel Opto Programming and Processing" that upgrades a standard PTAC into an "Intelligent Total Air Climate & Cleaning Conditioner" or iTACC. As shown in FIG. 4 there can be multiple or many inputs into one OPP (n to 1, i.e. multiple input, single output) or a signal could go to multiple OPPs (1 to n, i.e. single input, multiple output) or there could be many to many (n to n, i.e. multiple input, multiple output). All these various options and paths would result in some type of power output that is controlled through the OPP. As shown in FIG. 4, each OP profile 102 includes at least one axis with an operating range based on an input, such as temperature, and each concurrent OP profile 102 shows a concurrent operating range with at least one other OP profile to make them concurrent profiles for tandem operation (see below). As shown, each OP profile is different based on the type of power output that is controlled through the OPP.

As noted herein, in an iTACC according to the present invention, the various electrical components are operated in tandem. Tandem as used herein is not necessarily referring to the concurrent and independent operation of the electrical components (e.g. heater, ionizer, etc.) or electromechanical components (e.g. indoor fan, outdoor fan, compressor, etc.). Rather, in tandem as used herein refers to the concurrent interdependent operation of the components based on a OP profile in order to optimize the overall performance of the iTACC. For example, FIG. 8 shows a 3-D climate OP profile based on which A1 ASC 5 can provide operational signals to the various components of the iTACC. In FIG. 8, the values received from the sensors are along the x axis and the z axis. That is, the x-axis and the z-axis are input values. As shown, for example, the x-axis includes temperature values and the z-axis values from another sensor, such as, a humidity sensor. The generated output values are plotted on a y-axis. As is evident, there can be several y-axis each representing an output value. Thus, for example, one y-axis can have values representing the speed of the indoor fan motor, and another y-axis can be another electrical or electromechanical component. For example, another y-axis can be the values related to the operation of the compressor. In tandem operation, A1 ASC 5 would receive signals from one or more sensors, and would then find a data point representing the output necessary for the operation of AO-FI 1 and AO-Comp 14. Thus, for example, assuming that the set point for cooling is 75 degrees and the humidity (RH) is at 40% and the temperature sensor indicates the room temperature has risen to 78 degrees, A1 ASC 5 would then find a data point on a climate profiles such as the one shown in FIG. 8 to adjust the speed of AO-FI 1 and the performance of AO-Comp 14 in order to return the temperature of the room to the set point of 75. Moreover, A1 ASC 5 could take in not only temperature values, but could also take humidity values, and find a data point on the surface of a three dimensional climate profile such as the one shown in FIG. 8 based on which it would send output signals to AO-FI 1, and AO-Comp 14 or other electrical and electromechanical devices. In this example given that the RH of 40% is low, AO-FI 1 may increase in speed while AO-Comp 14 may not speed up for this RH level; but given the same temp conditions but with RH at 80% then both AO-FI 1 and AO-Comp 14 would in tandem react to this new combined temp/humidity condition and speed up. It is this tandem and concurrent capability that allows multiple real time sensor signal inputs to be managed in a simple but functionally powerful way by A1 ASC 5.

As can be appreciated, a climate profile is not limited to three dimensions, but can include as many input values and as many output values as desired. Thus, in addition to or instead of input values from a temperature sensor and a humidity sensor, input values from other sensors that could be climate based or air quality ($CO_2$, CO, $O_2$, $O_3$, NO, etc) or other active room conditions (room occupancy) or even remote signals. All of these could be accepted by A1 ASC 5 for the purpose of selecting a proper drive signal for one or more electrical or electromechanical components. As a result, the components of an iTACC according to the present invention can be operated concurrently in tandem not just in an independent manner, but in an interdependent manner based an OP climate profiles or other non-climate OP profiles.

According to another aspect of the present invention, the front grille or the entire exterior assembly of a PTAC can include an array of decor accenting colors, to theme oriented graphic artwork and design. Thus, the entire PTAC could be customized graphically, including colored, textured, made as simulated wood grain, or special graphics, photos, logos, or images could be included. Similar efforts could be effected on the wall sleeve as well along with some added insulation.

According to another aspect of the present invention, the rear grille assembly of a PTAC can be customized graphically to include an array of decor accenting colors, to theme oriented graphic artwork and design, including various colors, photos, images, logos and the like. Since these are also outside the building and visible from the street this could also be used for signs, including advertisements, logos, and other commercial messages.

Figure 9:
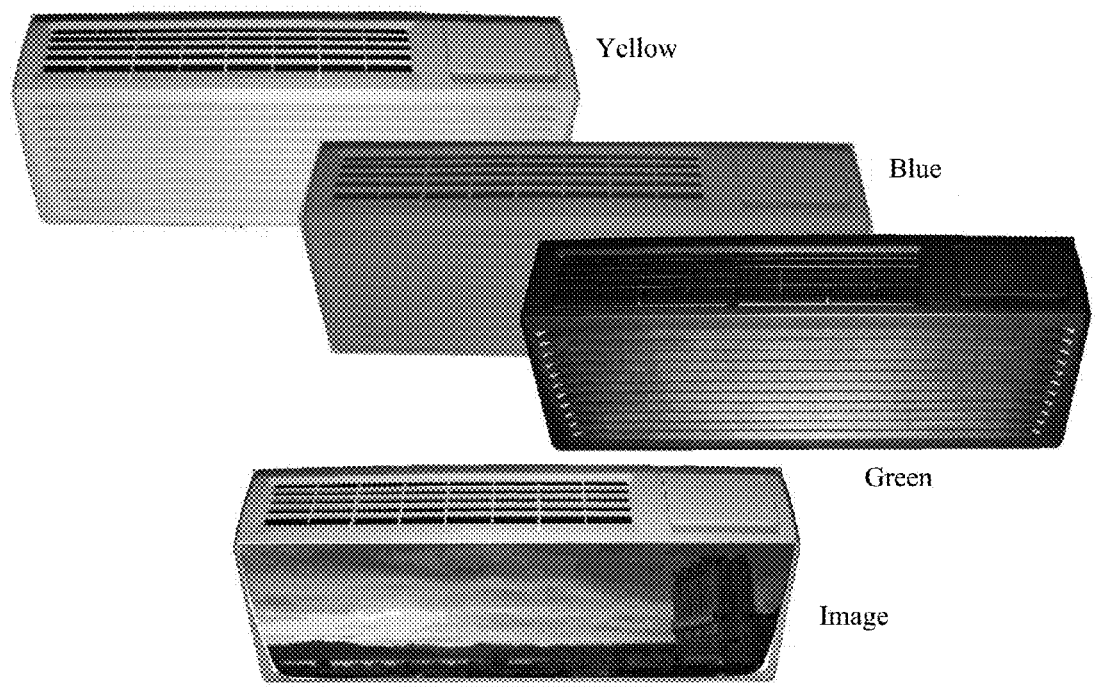
FIG. 9 illustrates PTAC and iTACC custom colors, photos and images on the indoor and outdoor covers according to another aspect of the present invention.

FIG. 9 shows a series of PTAC or iTACC covers in an assortment of colors, photos or images. Most PTAC covers are usually a simple plain white or vanilla color. The premise of using colors, photos and images allows a PTAC or iTACC user to match the unit to the room décor and lets it become a piece of room furniture as opposed to just a piece of room equipment. In a commercial or business environment these could be ads, signs or logos to promote a message or theme. This same technique and concept of various colors, patterns, images etc for the PTAC cover could be applied to the PTAC rear grille as well.

Present or standard PTAC through-the-wall sleeves are a single piece four sided fixed open box like item typically fabricated from steel. These are used to place a PTAC in for support and location for a through-the-wall installation. Once installed in the wall these sleeves serve a practical role of guiding and supporting a PTAC between the inside of a room and outside space. But outside their installed in-the-wall location standard PTAC wall sleeves are bulky, flimsy, fragile, and awkward to handle, ship, install and the like.

According to another aspect of the present invention, materials, other than Metal and plastic, can be used to manufacture a PTAC wall sleeve. Designs can be realized utilizing various types of wood, stained and/or finished in such a way as to provide an aesthetically pleasing wood cabinet style, and wood material treated with water and moisture resistant finishes that exceed performance of the common steel type counterparts.

Present "one-piece" wall sleeve fabrication techniques create many problems in transport/shipping in that units have to be palletized and shipped via freight.

According to one aspect of the present invention, a foldable/collapsible wall sleeve having strategically placed hinges is used to provide the following benefits:

SETUP—placement of the hinges is such that, unfolding the wall sleeve assembly and locking it into place can be done in less than a few minutes.

SHIPPING—the hinge mechanism is placed such that the assembly folds flattened into itself, for a compact shipping footprint and a dramatically reduced likelihood of damage as a result of shipping.

RIGIDITY—the hinged design method creates a cabinet that is mechanically superior to its preset fixed steel or plastic wall sleeve counterpart.

NOISE—in addition to the mechanical strength, the fabrication material, (wood in this case, although could be any number of materials) acts to manage unwanted radiant noise from the PTAC.

Figure 10A:
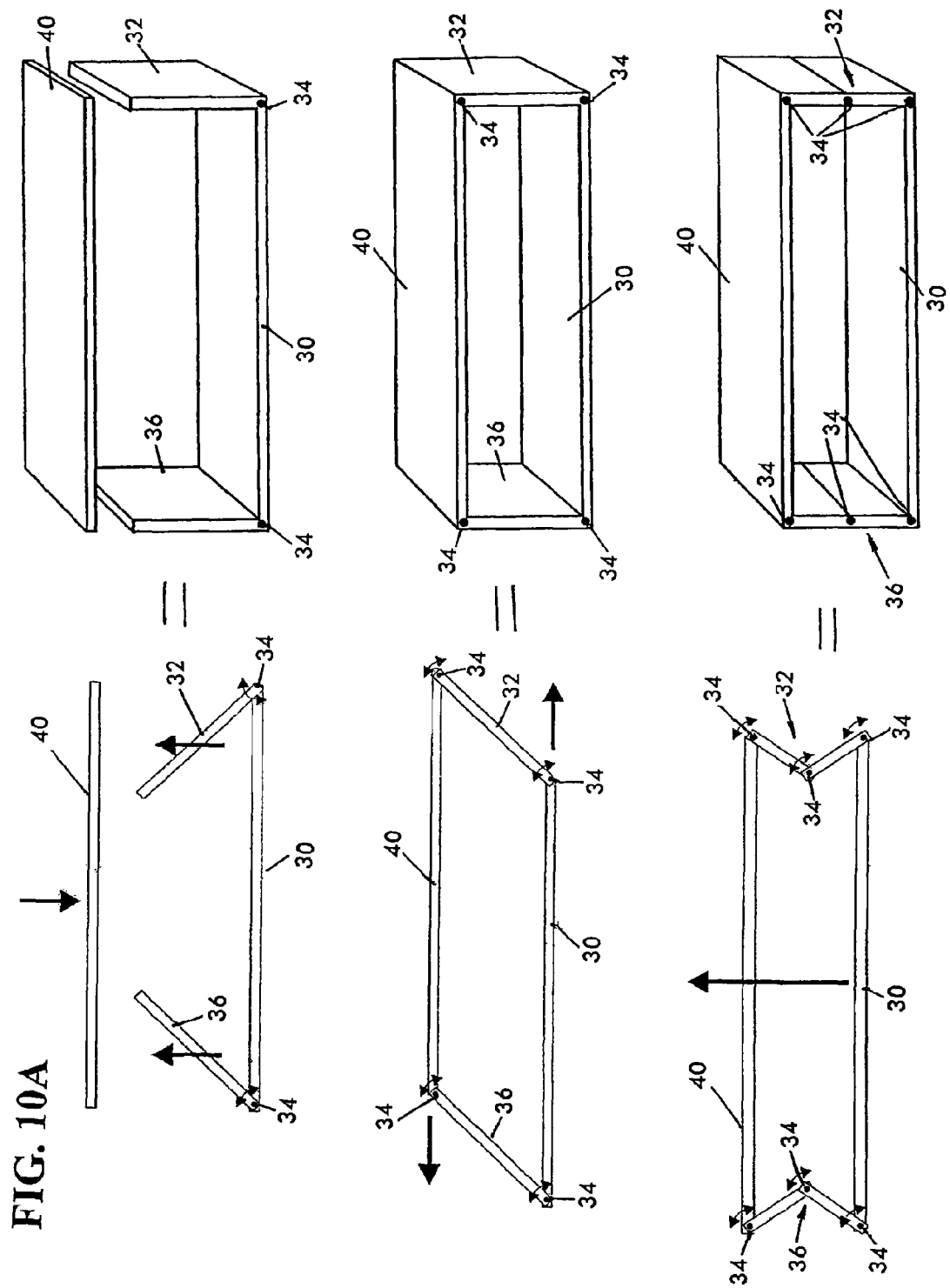
FIGS. 10A & 10 B illustrate a PTAC/iTACC collapsible stackable sleeve assembly according to another aspect of the present invention.
Figure 10B:
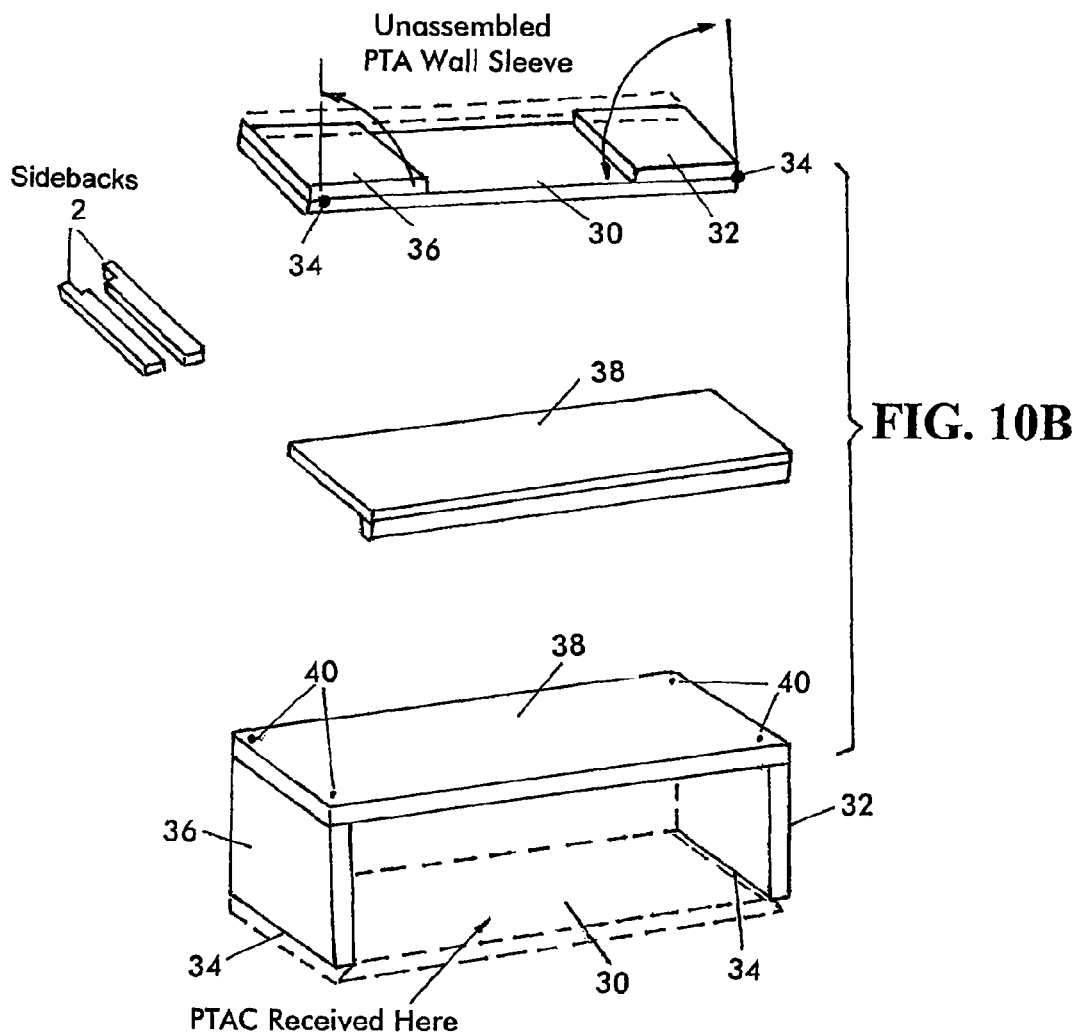
FIG. 10C illustrates an adapter housing assembly according to another aspect of the present invention.

FIG. 10B illustrates PWS-CR 12, according to another aspect of the present invention, which is a simple hinged, foldable, collapsible four sided box structure that is dimensionally the same size as a standard wall sleeve when set up to go through-the wall, but collapses or folds flat for handling, shipping, storage and the like. PWS-CR 12 includes a bottom base 30, a first side piece 32 coupled to one edge of bottom base 30 by a hinge 34, a second side piece 36 coupled to another edge (opposite the one edge) of bottom base 30 by a hinge 34, and a top 38 coupled by the free sides of side pieces 32, 36 by screws 40. Thus, by removing screws 40, top 38 can be removed and side pieces 32, 36 can be folded as illustrated. To set-up this new sleeve it is a simple matter of unfolding the wall sleeve's two vertical sides 32, 36 and attaching the top 38 with screws or fasteners. A PTAC or an iTACC unit can be then receive inside PWS-CR 12 as indicated. Referring to FIG. 10A, other folding options such as the sides with middle hinges would allow for no assembly required one only open need to open, lift and stand the sleeve into place. Various options can be employed to achieve the same purpose of a sleeve that is pre-assembled and can be laid flat and can simple opened to a rigid box. Thus, while the top illustration shows a collapsible sleeve according to FIG. 10B, the middle illustrated arrangement shows a collapsible sleeve in which screws 40 are replaced with hinges 34, which allow the collapsible sleeve to be shipped already assembled. The bottom arrangement is a further modification of the middle arrangement in which the sidewalls 32, 34 are divided into two pieces and then coupled to one another by hinges 34. Hinges 34 are preferably arranged so that sidewalls 32, 34 fold in an inwardly direction, i.e. toward one another. Thus, the collapsible sleeve, when folded, will be more compact, compared to the illustrated middle arrangement.

As stated above, present or standard PTAC through-the-wall sleeves are a single piece four sided fixed open box like item. These are used to place a PTAC in for support and location for a through-the-wall installation. Each wall sleeve is dimensionally designed to fit a single sized rectangular through-the-wall hole and fit a PTAC sized for that hole. Generally, these are sized to a couple of fixed sizes with a standard PTAC size being 42"W×16"H×14"D, so the standard wall sleeve has this as its inner dimension size. Earlier PTAC versions and non-standard PTACs are 36"W×16"H×14"D; there are some other sizes but these two sizes are the majority. Depending on the wall thickness, once the wall sleeve is installed, unless the wall depth is approximately the depth of the wall sleeve, the wall sleeve and the PTAC will overhang the wall. The PTAC will extend into the room or hang outside the building wall depending on how far or how much overhang there is in extra depth.

Figure 10C:
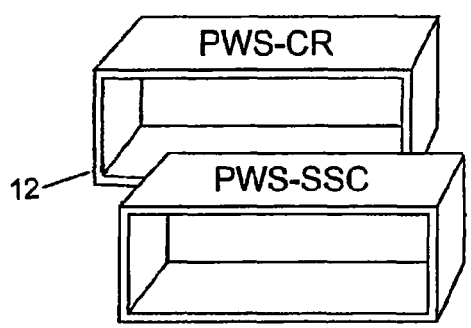

FIG. 10C further shows a PTAC/iTACC Wall Sleeve—Standard Size Converter=PWS-SSC according to another aspect of the present invention. FIG. 10 shows a two hole sized two pieced sleeved structure that has an inside the room piece (PWS-CR) sized to fit the PTAC/iTACC and the second through-the-wall piece (PWS-SSC) sized to fit the wall hole size. PWS-SSC can be nested inside PWS-CR, which can allow, for example, a standard 42" wide PTAC to be used with a 36" wide wall hole. Thus, the PTAC or iTACC and inner 42"W wall sleeve would sit completely inside the room with a slight offset distance from the outer part of this sleeve which goes through the wall. PWS-SSC can be made size-adjustable as an adapter to fit standard iTACCs into undersized openings.

In utilizing this sleeve for example, one could mount and fit a standard 42" wide PTAC into a smaller, but common 36" opening, and other smaller sizes.

Figure 11A:
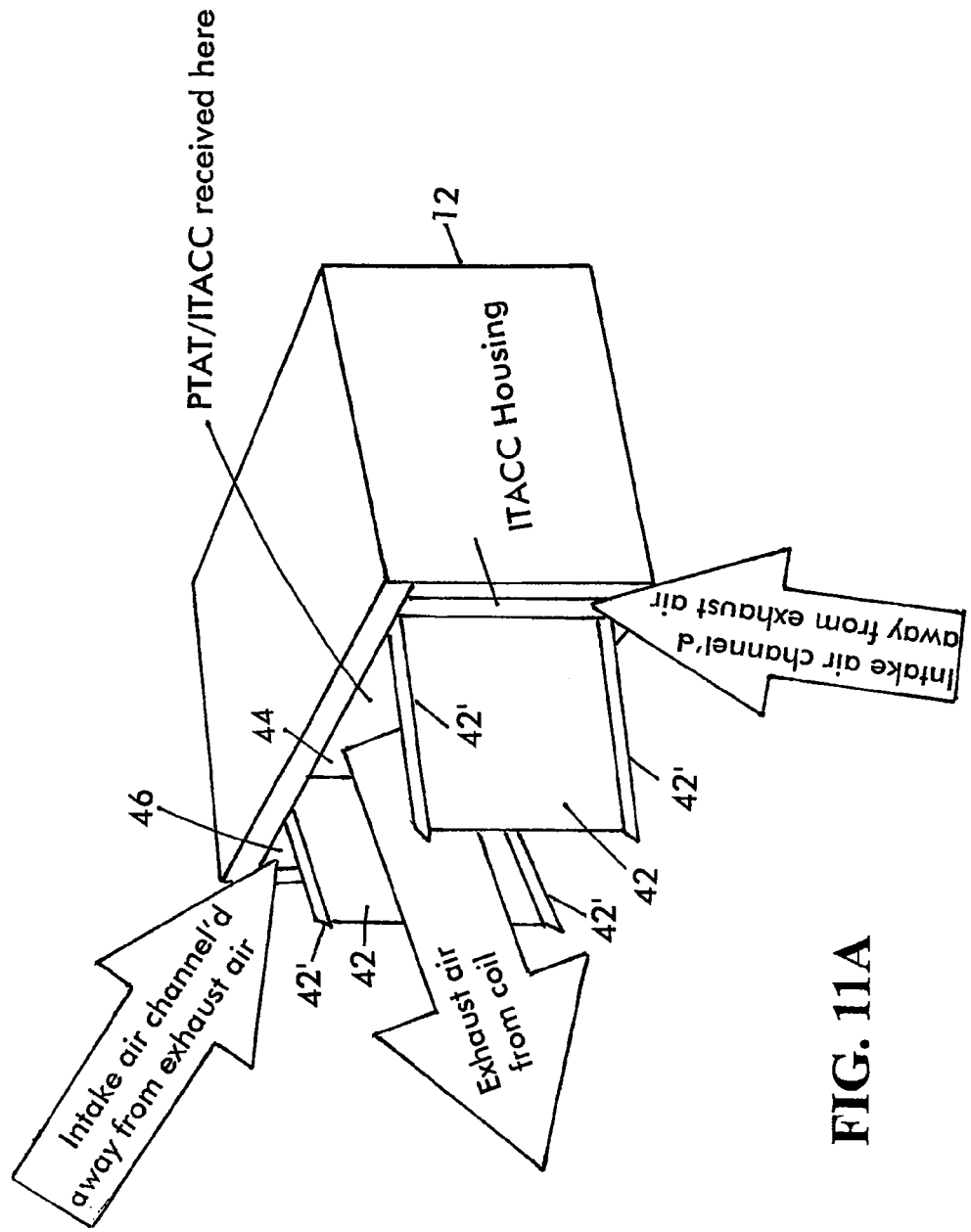
FIG. 11A illustrates a PTAC/iTACC "thru-the wall" sleeve converter or necked down adaptor according to another aspect of the present invention.

Referring to FIG. 11A, an iTACC according to the present invention can include directional louvers 42 according to an aspect of the present invention. Louvers 42 are assembled onto the back of a PTAC housing in order to facilitate intake and exhaust of air into the unit. Louvers 42 according to the present invention are directionally adjustable and can increase iTACC's outdoor heat core's efficiency. As illustrated, louvers 42 can be pivotally installed spaced from the edges of side pieces 32 and 36, whereby three channels are created: a central channel 44 to allow for passage of exhaust air from the back of HCE-O 16b, and two side channels 46 each adjacent a respective side of a central channel to allow for the intaking of air. Each louver 42 may include bent edges 42' which preferably face away from central channel 44 to facilitate air flow.

FIG. 11B illustrates how a housing 12 provided with louvers 42 can be installed in an opening 48 in a wall 50. Note that because louvers 42 allow for a central channel 44 for the exhaust air, opening 48 need not be the exact size of housing 12. Rather, it can be smaller (i.e. less wide) and still allow for the installation of the iTACC unit. Thus, louvers 42 can also facilitate retrofitting a standard 42" iTACC into a non-conventional 36" window width sleeve.

In many PTAC installations, customers find the appearance of a PTAC unsightly. Where concern for the aesthetics of a PTAC installation is an issue, custom cabinetry can be used to house the PTAC. The PTAC would be encased in a piece of custom built furniture with the following properties:

Flexible height—designed to be fully adjustable in height by the addition of side pieces and front pieces to accommodate a variety of circumstances.

Variety of construction materials—PTAC furniture enclosures could be made to order to satisfy a customer's designer interest. Made from a variety of materials: various types of wood, plastics, and the like.

Moisture resistant—Wood materials would be specially treated with moisture resistant finishes, and fastened together with moisture resistant hardware, ceramic screws, and the like.

Hinged top—Top of the PTAC furniture would utilize a hinge top. The top could serve as a small table, large display shelf, or the like.

Integrated cabinet filters—The PTAC furniture could integrate wood grating or filters into the cabinet itself, thus completely hiding the unsightly PTAC without affecting its functionality.

Front panel hinged—Hinged front panel would provide easy access to PTAC and internal filters for maintenance.

Designer cabinetry—artwork, colors, wood stain, fabric, etc. could be all made-to-order from customer specification.

Design with materials optimized for further noise reduction.

Figure 12:
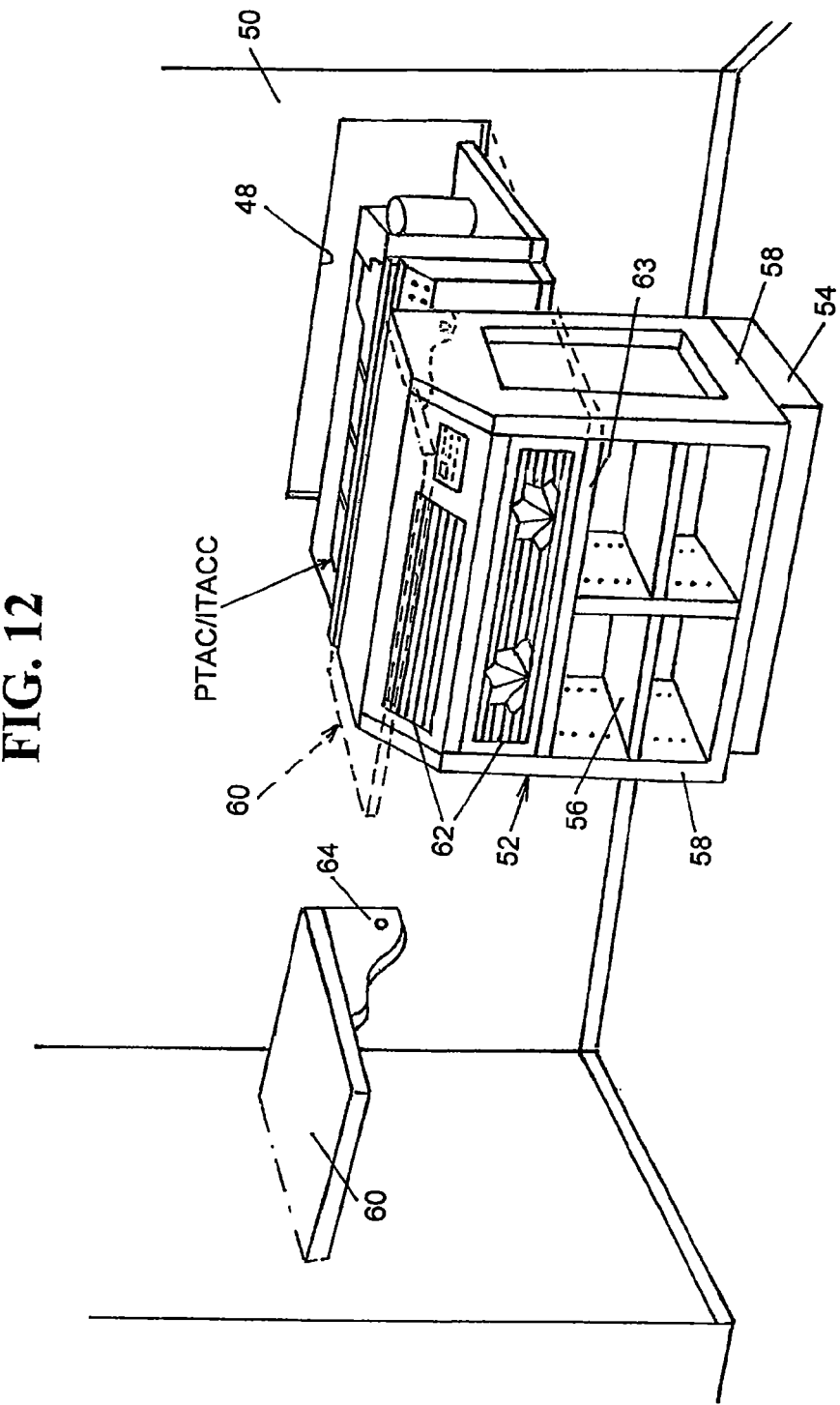
FIG. 12 illustrates an exterior view of a furniture enclosure design according to an aspect of the present invention.
Figure 12:
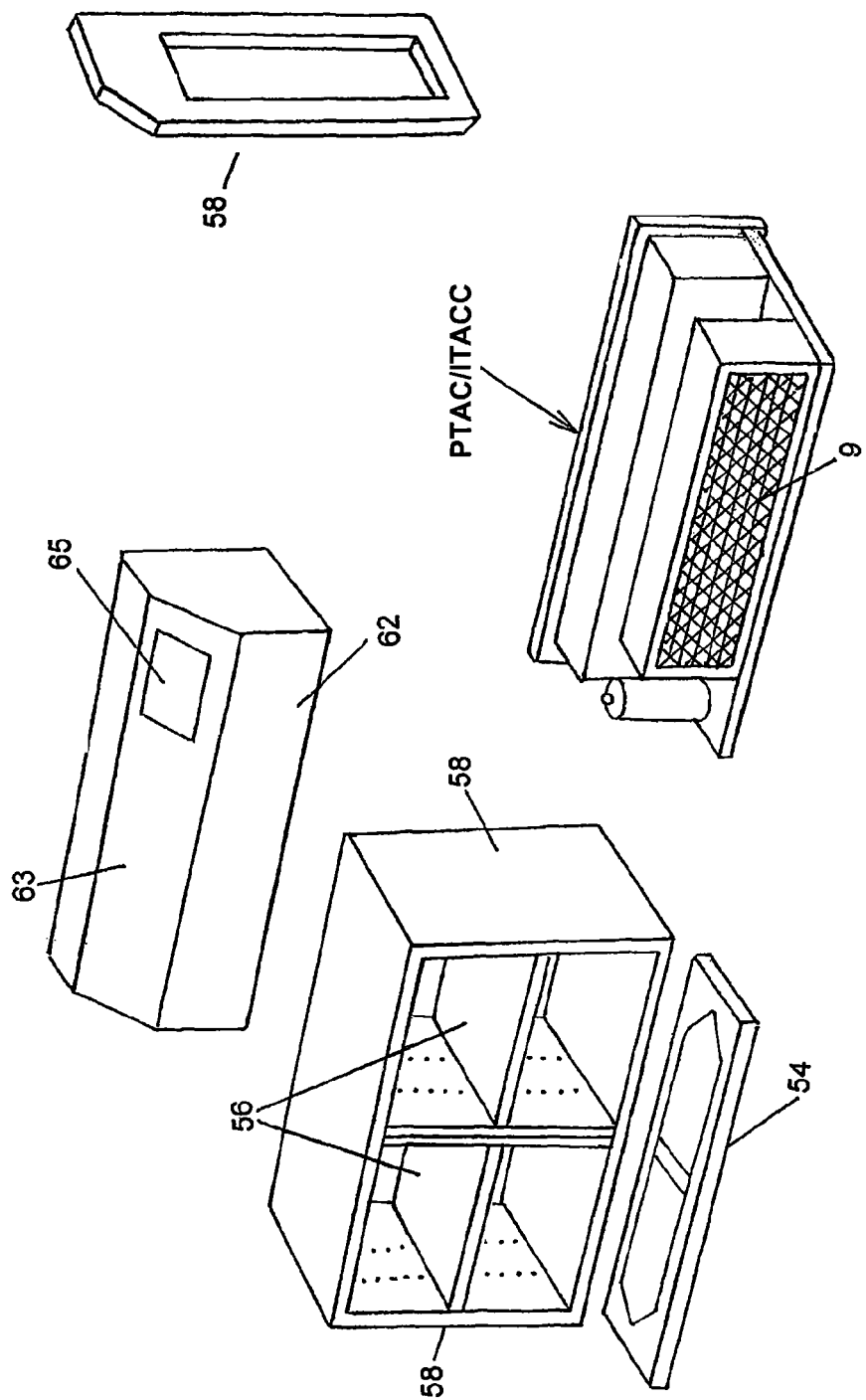

FIG. 12 illustrates a potential design.

Figure 13:
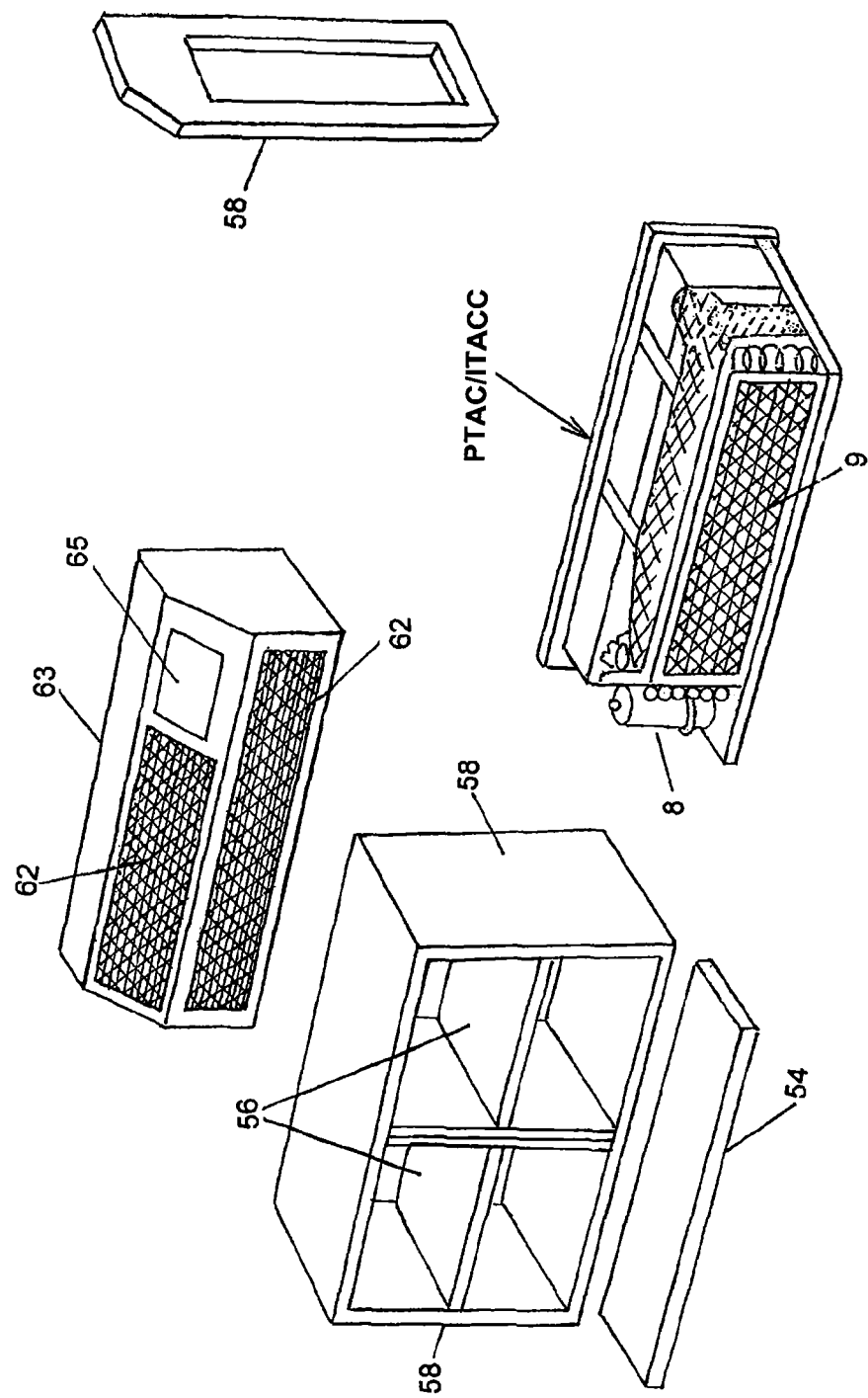
FIG. 13 illustrates a custom grille according to one aspect of the present invention.

FIG. 13 illustrates a custom grille, fabricated from oak, which can be used in a cabinet according to the present invention.

Referring to FIGS. 12 and 13, a cabinet assembly 52 according to another aspect of the present invention includes preferably a kick plate 54, an adjustable shelf assembly 56 disposed over kick plate 54, two side covers 58 each assembled on a respective side of adjustable shelf assembly 56, and preferably a writing table 60 (or some other platform, shelf-like arrangement) assembled to the top edges of side covers 58. Side covers 58 extend above the top surface of adjustable shelf assembly 56 and thus, in combination with writing table 60 define a space in which a PTAC or ITACC unit can be received. Note that grill like bodies 62 can be assembled onto side covers 58 (which can be part of a case 63) to hide the front side of PTAC/ITACC when it is received in the defined space. Further note that writing table 60 may be hingedly assembled so that it may be lifted to allow access to the PTAC/ITACC unit. Advantageously, a cabinet assembly 52 according to the present invention may allow the PTAC/ITACC unit to reside inside the room entirely without adversely affecting the aesthetics of the room, while minimizing or eliminating the unsightly appearance of extending the unit outside the wall or a window.

Note that case 63 may further include a control cover 65 which can be lifted selectively to allow access to the controls of the PTAC/ITACC.

Figure 14:
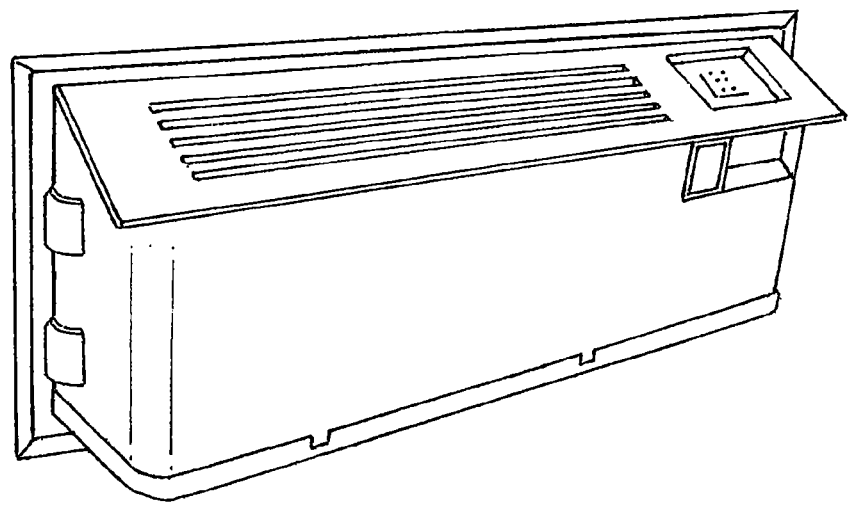
FIG. 14 illustrates a custom grille fitted to a PTAC according to an aspect of the present invention.

FIG. 14 illustrates the custom grille of FIG. 13 fitted to a PTAC in place of the PTAC's top cover.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An intelligent total air climate and cleaning conditioner (iTACC), comprising:
   an optically programmed adaptive system controller capable of receiving multiple input signals from a plurality of sensors, and capable of providing multiple output power signals and multiple output control signals;
   an indoor fan disposed in an indoor section of said iTACC and operatively connected to said adaptive system controller to receive at least one of said multiple output power signals and multiple output control signals, whereby said indoor fan generates an air flow adapted to at least one of the multiple input signals received by said adaptive system controller; and
   an active heating/cooling element operatively connected to said adaptive system controller to receive at least another one of said multiple output power signals and multiple output control signals, whereby said active heating/cooling element uses the at least one of said multiple output power signals to power the active heating/cooling element to generate a change in air temperature in the air flow adapted to at least one of the multiple input signals received by said adaptive system controller; and
   wherein said adaptive system controller uses a first concurrent profile based on air flow rate to continuously and adaptively controls said indoor fan and uses a second concurrent profile based on heat/cool capacity of said active heating/cooling element to continuously and adaptively control said active heating/cooling element in tandem over a concurrent operating range for the iTACC using at least one of the multiple input signals received by said adaptive system controller, the first concurrent profile and the second concurrent profile having different optically programmed profiles and at least one common input signal from the at least one multiple input signals.

2. An iTACC according to claim 1, further comprising an outdoor fan disposed in an outdoor section of said iTACC and operatively connected to said adaptive system controller to receive at least one of said multiple output power signals and multiple output control signals, whereby said outdoor fan generates a change in the air flow adapted to an at least one of the multiple input signals received by said adaptive system controller and wherein said adaptive system controller continuously and adaptively controls said indoor fan, said active heating/cooling element, and said outdoor fan in tandem based upon the at least one optically programmed profile.

3. An iTACC according to claim 1, further comprising an outdoor air damper disposed in an outdoor section of said iTACC and operatively connected to said adaptive system controller to receive at least one of said multiple output power signals and multiple output control signals, whereby said outdoor air damper generates a change in the air flow adapted to an at least one of the multiple input signals received by said adaptive system controller and wherein said adaptive system controller continuously and adaptively controls said indoor fan, said active heating/cooling element, and said outdoor air damper in tandem based upon the at least one optically programmed profile.

4. An iTACC according to claim 1, further comprising an electronic air ionizer operatively connected to said adaptive system controller to receive at least one of said multiple output power signals and multiple output control signals, whereby said outdoor electronic air ionizer generates a change in an ionization level of the air flow adapted to an at least one of the multiple input signals received by said adaptive system controller and wherein said adaptive system controller continuously and adaptively controls said indoor fan, said active heating/cooling element, and said electronic air ionizer in tandem based upon the at least one optically programmed profile.

5. An iTACC according to claim 1, wherein said active heating/cooling element is an electric heating element and the at least one of said multiple output power signals and multiple output control signals received by said electric heating element provides a continuously variable energy input to drive heating of said electric heating element.

6. An iTACC according to claim 1, wherein said active heating/cooling element is a compressor driving at least one heat/cool exchanger and the at least one of said multiple output power signals and multiple output control signals received by said compressor provides a continuously variable energy input to drive a motor of said compressor.

7. An iTACC according to claim 1, further comprising a manual fan speed override control operatively connected to said adaptive system controller and providing at least one of the multiple input signals to said adaptive system controller whereby a continuously variable speed of said indoor fan is manually controlled.

8. An iTACC according to claim 1, further comprising a remote control device that has two way communications with said adaptive system controller and provides at least one of the multiple input signals to said adaptive system controller.

9. An iTACC according to claim 6, further comprising a sleeve that is capable of wicking up water, the sleeve being disposed around said compressor.

10. An iTACC according to claim 9, wherein said sleeve includes sleeve extensions for wicking up water from a condensation pan.

11. An iTACC according to claim 1, further comprising a collapsible wall sleeve including a base, a first side piece connected to the base by a first hinge, a second side piece connected to the base by a second hinge, and a top removably coupled to the first side piece and the second side piece, whereby the collapsible wall sleeve is folded for shipping.

12. An iTACC according to claim 1, further comprising an indoor filter disposed in said indoor section, and an outdoor filter disposed in an outdoor section of said iTACC, and wherein said indoor filter and said outdoor filter have filtration densities selected to complement a variable air velocity range of the air flow.

13. An iTACC according to claim 1, further comprising an acoustic noise barrier disposed between said indoor section and an outdoor section of said iTACC.

14. An iTACC according to claim 1, further comprising a manual control in communication with said adaptive system controller.

15. An iTACC according to claim 1, wherein at least one of said plurality of sensors senses environmental conditions.

16. An iTACC according to claim 15, wherein said environmental conditions include temperature, humidity, and pressure.

17. An iTACC according to claim 1, wherein at least one of said plurality of sensors senses gases.

18. An iTACC according to claim 17, wherein said gases include CO, CO2, O2, O3, NO, and Radon.

19. An iTACC according to claim 1, wherein at least one of said plurality of sensors can sense a non-environmental condition.

20. An iTACC according to claim 19, wherein said non-environmental condition includes occupancy, speed, airflow, proximity, and noise.

21. An iTACC according to claim 2, wherein said outdoor fan is operated to cause air to flow toward said outdoor section.

22. An iTACC according to claim 1, further including an indoor portion of an exterior assembly of said iTACC customized graphically.

23. An iTACC according to claim 1, further including an outdoor portion of an exterior assembly of said iTACC customized graphically.

24. An iTACC according to claim 1, further including an outdoor portion of an exterior assembly of said iTACC that includes a sign.

25. An iTACC according to claim 1, further including a cabinet that can be blended into the indoor room environment as a piece of quality furniture.

* * * * *